United States Patent
Tsuruga et al.

(10) Patent No.: US 6,538,414 B1
(45) Date of Patent: Mar. 25, 2003

(54) ELECTRIC ENERGY STORAGE DEVICE WITH CELL ENERGY CONTROL, AND METHOD OF CONTROLLING CELL ENERGY

(75) Inventors: Kikuo Tsuruga, Sendai (JP); Akio Hasebe, Sendai (JP); Kazuya Mori, Sendai (JP); Sumiko Seki, Tokyo (JP); Takahiko Ito, Tokyo (JP)

(73) Assignee: Tokin Corporation, Sendai (JP)

( * ) Notice: Subject to any disclaimer, the term of this patent is extended or adjusted under 35 U.S.C. 154(b) by 0 days.

(21) Appl. No.: 09/869,737

(22) PCT Filed: Nov. 6, 2000

(86) PCT No.: PCT/JP00/07779
§ 371 (c)(1),
(2), (4) Date: Jul. 3, 2001

(87) PCT Pub. No.: WO01/33692
PCT Pub. Date: May 10, 2001

(30) Foreign Application Priority Data

Nov. 5, 1999 (JP) ............................ 11-315520
Jun. 26, 2000 (JP) ........................ 2000-191301

(51) Int. Cl.⁷ ........................ H01M 10/44; H01M 10/46
(52) U.S. Cl. ........................................................ 320/119
(58) Field of Search ............................... 320/116, 117, 320/118, 119, 122

(56) References Cited

U.S. PATENT DOCUMENTS

| 4,555,754 A | 11/1985 | Hennevin |
| 5,594,320 A | 1/1997 | Pacholok et al. |
| 5,821,729 A | 10/1998 | Schmidt et al. |
| 5,969,505 A | 10/1999 | Okamura |
| 6,373,223 B1 * | 4/2002 | Anzawa et al. ............. 320/118 |

FOREIGN PATENT DOCUMENTS

| DE | 197 53 210 A | 7/1999 |
| EP | 1 047 172 A2 | 10/2000 |
| JP | 8-214454 | 8/1996 |
| JP | 10-174283 | 6/1998 |

OTHER PUBLICATIONS

C. Pascual et al; Switched Capacitor System For Automatic Series Battery Equalization; 1997 IEEE; pp. 848–854.

* cited by examiner

Primary Examiner—Edward H. Tso
(74) Attorney, Agent, or Firm—Frishauf, Holtz, Goodman & Chick, P.C.

(57) ABSTRACT

An energy adjusting device is provided which transfers energy charged in an arbitrary cell to the input/output terminals of a unit energy storage device. The energy adjusting device includes a transformer having a plurality of primary coils and a secondary coil mutually coupled magnetically but electrically insulated, switching circuits which open and close the circuits of the primary coils of the transformer connected to the arbitrary cell, a circuit connecting the secondary coil of the transformer via a rectifying circuit to the input/output terminals of the unit energy storage device, and a control circuit which, by operating the switching circuits, adjusts the amount of energy stored in the cells to a specific ratio with respect to the amount of energy stored by the unit energy storage device.

33 Claims, 20 Drawing Sheets

A: ADDRESS LINE
D: DATA LINE

A: ADDRESS LINE
D: DATA LINE

A: ADDRESS LINE
D: DATA LINE

A: ADDRESS LINE
D: DATA LINE

ELECTRIC ENERGY STORAGE DEVICE WITH CELL ENERGY CONTROL, AND METHOD OF CONTROLLING CELL ENERGY

This application is a U.S. National Phase Application under 35 USC 371 of International Application PCT/JP00/07779 (not published in English) filed Nov. 6, 2000.

TECHNICAL FIELD

This invention relates to an electrical energy storage device comprising a plurality of capacitor cells or secondary battery cells, or a plurality of other electrical energy storage cells, connected in series to each other. In particular, this invention relates to an electrical energy storage device provided with a cell energy adjustment device for performing energy allocation of the stored energy amount to bring an energy amount stored in one energy storage unit, which is a single cell or comprises a plurality of cells, to a target value, as well as a method for cell energy adjustment like this.

BACKGROUND ART

Conventionally, electrical energy storage cells are connected in series to each other to configure an energy storage device with a higher terminal voltage and a larger energy storage capacity than the single cell. However, management of the energy amounts stored in the individual cells in this device has hardly ever been performed.

In a configuration using capacitors as cells, resistances may be connected in parallel with the individual cells as disclosed in for example, Japanese Patent Application Laid-open No. 10-174283, or constant-voltage elements such as Zener diodes may be connected in parallel, whereby individual cells are charged in parallel charging or in partial parallel charging so that the cells are charged to have an equal voltage.

When there is no management of individual cells connected in series for charging and discharging, the cells in a conventional storage battery partially often reach a state of overcharge or overdischarge, so that those cells are degraded in performance or are broken. Alternatively, in use of cells such as capacitors which physically store charge, there is the possibility that the terminal voltage of a certain or some cells may exceed the cell withstand voltage, resulting in degradation or damage. As measures for avoiding this, it has been taken, for example, to lower the operation ratings of the energy storage device. Accordingly, it has been necessary to set the power density and energy density of the energy storage device below the values intrinsic to the cells.

Noting the low energy efficiency of these conventional technologies, a method has been proposed in which capacitors are connected to a plurality of coils of a transformer via a switching circuit and charged at equal voltages (cf. Japanese Patent Application Laid-open No. 8-214454).

However, in this conventional method, the voltages can be rendered equal upon charging, but thereafter it is not possible to render the voltages equal to each other during a waiting state before start of discharge or in the discharged state. Therefore it is not true that energy is always utilized effectively.

Hence, a new energy storage device is extremely promising which is provided with a cell energy adjustment device for managing the energy amounts of individual cells and performing the reallocation of energy. In an actual configuration of the energy storage device which performs the cell energy adjustment, the energy storage device comprises a plurality of cell series units connected in series to each other, each of the cell series units comprising a plurality of cells connected in series to each other, to thereby increase the overall energy amount, and is operated with adjusting the cell energy amounts.

The energy storage device actually uses diodes or other rectifying elements for transferring energy, each of which have the forward voltage approximately 0.7 V which cannot be neglected compared with the voltages, 1 V to 3 V, of capacitors or secondary battery cells. Hence a method is used in which the voltage is raised and energy is transferred to an entire cell series of a plurality of cells connected in series to each other.

Thus, in the configuration in which a plurality of cell series units, each unit comprising a plurality of capacitors or secondary battery cells connected in series to each other, are connected in series to each other, it has been necessary as described above to greatly raise the voltage in order to transfer energy to the entire of the cell series units, and therefore there have been many problems.

Hence one object of this invention is to provide an energy storage device comprising an energy adjustment device capable of preserving the energy stored in the individual cells forming a unit energy storage device, at an optimal target value, without loss caused in principle, whether during charging, discharging, or standby.

Another object of this invention is to provide an energy adjustment method capable of preserving the energy stored in the individual cells forming a unit energy storage device, at an optimal target value, without loss caused in principle, whether during charging, discharging, or standby.

DISCLOSURE OF THE INVENTION

This invention provides an energy storage device comprising a unit energy storage device comprising a plurality of capacitor cells or secondary battery cells connected in series to each other; and a device for transferring energy charged in one cell selected from the plurality of cells to the input/output terminals of the unit energy storage device from the selected one cell; the transferring device comprising a transformer having a plurality of primary coils and a secondary coil mutually magnetically coupled and electrically insulated; a switching circuit which opens and closes a connection circuit connecting between one coil among the plurality of primary coils of the transformer and the selected one cell; a circuit which connects the secondary coil of the transformer to the input/output terminals of the unit energy storage device through a rectifying circuit; and, a control circuit which, by driving the switching circuit, adjusts the energy stored in the selected one cell to a specific ratio with respect to the overall energy amount stored by the unit energy storage device; thereby the cell energy amounts being adjusted.

Further, according to this invention, a large-capacity energy storage device is obtained in which a plurality of the above-mentioned unit energy storage devices are connected in series to each other to thereby obtain a terminal voltage higher than that of a unit energy storage device, while also storing larger amounts of energy than a unit energy storage device; and which is provided with an energy storage device which transfers the energy charged in one cell selected from the plurality of cells to the input/output terminals of the unit energy storage device from the selected one cell, the cell energy adjustment device comprising a transformer having a plurality of primary coils and a secondary coil mutually magnetically coupled and electrically insulated; a switching circuit which opens and closes a connection circuit connecting one coil among the plurality of primary coils of the transformer and the selected one cell; a circuit which connects the secondary coil of the transformer to the input/output terminals of the unit energy storage device through a rectifying circuit; and a control circuit which, by driving the switching circuit, adjusts the energy stored in the selected one cell to a specific ratio with respect to the energy stored by the unit energy storage device; and wherein a relationship between the unit energy storage devices and the large-capacity energy storage device is made similar to another relationship between the energy cells and the unit energy storage device in the cell energy adjustment device, or connections of energy storage devices are further expanded to an arbitrary number of layers.

Further, according to this invention, an energy storage device having a cell energy adjustment device is obtained, characterized in that a plurality of energy storage cell series, each series comprising a single electrical energy storage cell or a plurality of electrical energy storage cells, are connected in series to each other; each of the energy cell series is provided with a device which measures the energy amount of the series, memorizes and processes the measured energy amounts; the cell energy adjustment device driving the switching circuit controlled by the latter device to transfer, via a transformer, the energy charged in the selected one energy storage cell series from the energy storage cell series; in which a plurality of coils are provided corresponding to the energy storage cell series; transformers are provided corresponding to energy storage cell series; a circuit is configured connecting the coils of the transformers, the switching circuits, and rectifying circuits; and energy is directly transferred from a selected one energy storage cell series to another energy storage cell series.

Further, according to this invention, an energy adjustment method is obtained, characterized in that a plurality of energy storage cell series, each series comprising either a single electrical energy storage cell or a plurality of electrical energy storage cells, are connected in series to each other; a device is provided which measures the energy of the respective energy storage cell series, and another device is provided which memorizes and process the measured amounts; and energy charged in the selected one energy storage cell series is transferred from the one energy storage cell series through a transformer by operating switching circuits controlled by the latter device; wherein transformers are provided corresponding to the respective energy storage cell series, the coils of the transformers, switching circuits and rectifying circuits are connected so that energy is transferred directly from the selected one energy storage cell series to another energy storage cell series.

Further, according to this invention, an electrical energy storage device having a cell energy adjustment device is obtained, characterized in that a plurality of energy storage cell series, each series comprising a single electrical energy storage cell or a plurality of electrical energy storage cells, are connected in series to each other; the cell energy adjustment device is provided with a device which measures the energy amount for each of the energy storage cell series, and memorizes and processes the measured energy amount, and the energy charged in the selected one energy storage cell series is transferred through a transformer from the one energy storage cell series; wherein a plurality of coils are provided corresponding to the energy storage cell series; transformers are provided corresponding to the respective energy storage cell series; a circuit is configured which connects the coils of the above transformers, the switching circuits, and rectifying circuits; and energy is directly transferred from a selected one energy storage cell series to other energy storage cell series.

Further, according to this invention, an energy storage device is obtained which comprises a cell series of a plurality of energy storage cells connected in series and a cell energy adjustment device to adjust the energy amount of each of the cells, characterized in that the energy adjustment device comprises first switching circuits connected in series to the first energy storage cells, respectively, and a first transformer comprising a plurality of coils connecting the first switching circuits and the series of the first energy storage cells; and wherein each of the first switching circuits comprises a first FET and either one of a diode connected in series to and in a direction opposed to a first parasitic diode of the first FET or a second FET having a second parasitic diode in a direction opposed to the first parasitic diode of the first FET.

Further, according to this invention, an energy storage device is obtained, characterized in that a cell energy adjustment device which adjusts the energy amounts of respective cells in a plurality of first energy storage devices has first switching circuits connected in series to the respective first energy storage devices, and a first transformer comprising a plurality of coils respectively connecting the first switching circuits to the plurality of first energy storage devices, a plurality of the first energy storage cell rows connected to the first transformer coils being connected in series to each other; wherein each of the first switching circuits comprises a first FET and either one of a diode connected in series to and in a direction opposed to a first parasitic diode of the FET or a second FET having a second parasitic diode in a direction opposed to the first parasitic diode of the first FET.

Further, according to this invention, an energy storage device is obtained wherein, in a cell energy adjustment device which adjusts the energy amount of each of cells in a plurality of first energy storage devices, a first switching circuit is configured by an FET and a Schottky barrier diode connected in parallel to each other; the first switching circuit is connected in series to one of the first energy storage devices and to one of the coils of a first transformer having a plurality of coils; and wherein a plurality of first energy storage devices connected to the first transformer coils are connected in series to each other.

BEST MODE FOR CARRYING OUT THE INVENTION

Figure 1:
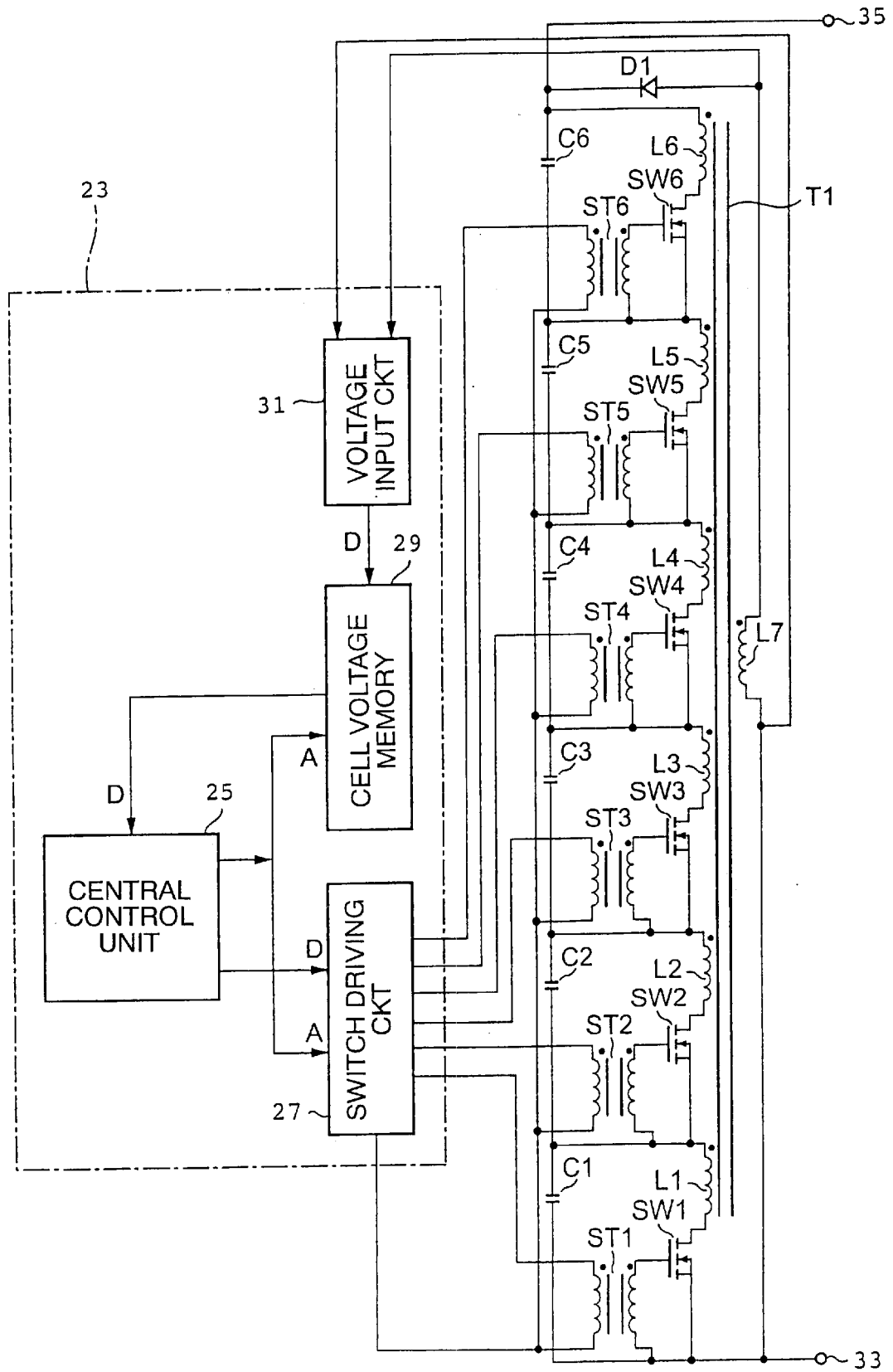
FIG. 1 is a circuit diagram showing a unit energy storage device having a cell energy adjustment device using a backward converter, according to a first embodiment of this invention.

Now, description will be made as to embodiments of this invention, hereinbelow, referring to the drawings.

Referring to FIG. 1 to FIG. 5, examples of application of this invention to energy storage devices employing electrical double-layer capacitors as energy storage cells are explained.

Energy storage by an electrical double-layer capacitor is performed through the accumulation of electric charge, and so the terminal voltage increases or decreases according to increase or decrease in the amount of energy stored. Here description will be made as regards a case in which six electrical double-layer capacitors are connected in series, but any number of electrical double-layer capacitors may be used.

Referring to FIG. 1, a first embodiment of this invention is shown wherein a backward converter is used for an energy recovery circuit.

A control circuit 23 comprises a central control unit 25, a switch driving circuit 27, a cell voltage memory 29, and a voltage input circuit 31. When the voltages of the energy storage cells C1, C2, C3, C4, C5, and C6 are at arbitrary values equal to or below the maximum rated voltage of the respective electrical double-layer capacitors, a selected one of switches SW1, SW2, SW3, SW4, SW5, and SW6 is turned on for a specified time by means of a switching signal from the switch driving circuit 27 via a gate driving transformer (second transformer) ST1, ST2, ST3, ST4, ST5, and ST6, according to an instruction from the central control unit 25. Current flows in one of the primary coils L1, L2, L3, L4, L5, and L6 of the energy transfer transformer (first transformer) T1 corresponding to the switch in question, and a voltage appears on the secondary coil L7 which is determined by the voltage of the electrical double-layer capacitor in question according to the coil windings ratio. This appearing voltage passes through the voltage input circuit 31, and is stored in the cell voltage memory 29. Similar voltage storing is performed for cell voltages of the remaining electrical double-layer capacitors.

Immediately after switches SW1 through SW6 are turned off, the energy magnetizing the transformer T1 passes through the power rectifier D1 and is sent to the input/output terminals 33 and 35 and recovered.

The switch corresponding to a cell with an excessive terminal voltage is turned on and off repeatedly, according to criteria set in advance, to allocate part of the energy stored in the cell in question to other cells. At this time, the cell in question also receives an allocation; but as the number of cells in series increases, the fraction of the allocation to the cell in question is reduced. This allocation operation is theoretically valid for series cells of two or more.

Though not shown in the figure, it is also possible to, for example, add a third coil L8 to the first transformer T1 and to connect both ends of the third coil L8 to the voltage input circuit 31 for voltage detection, without use of secondary coil L7 for the voltage detection.

Figure 2:
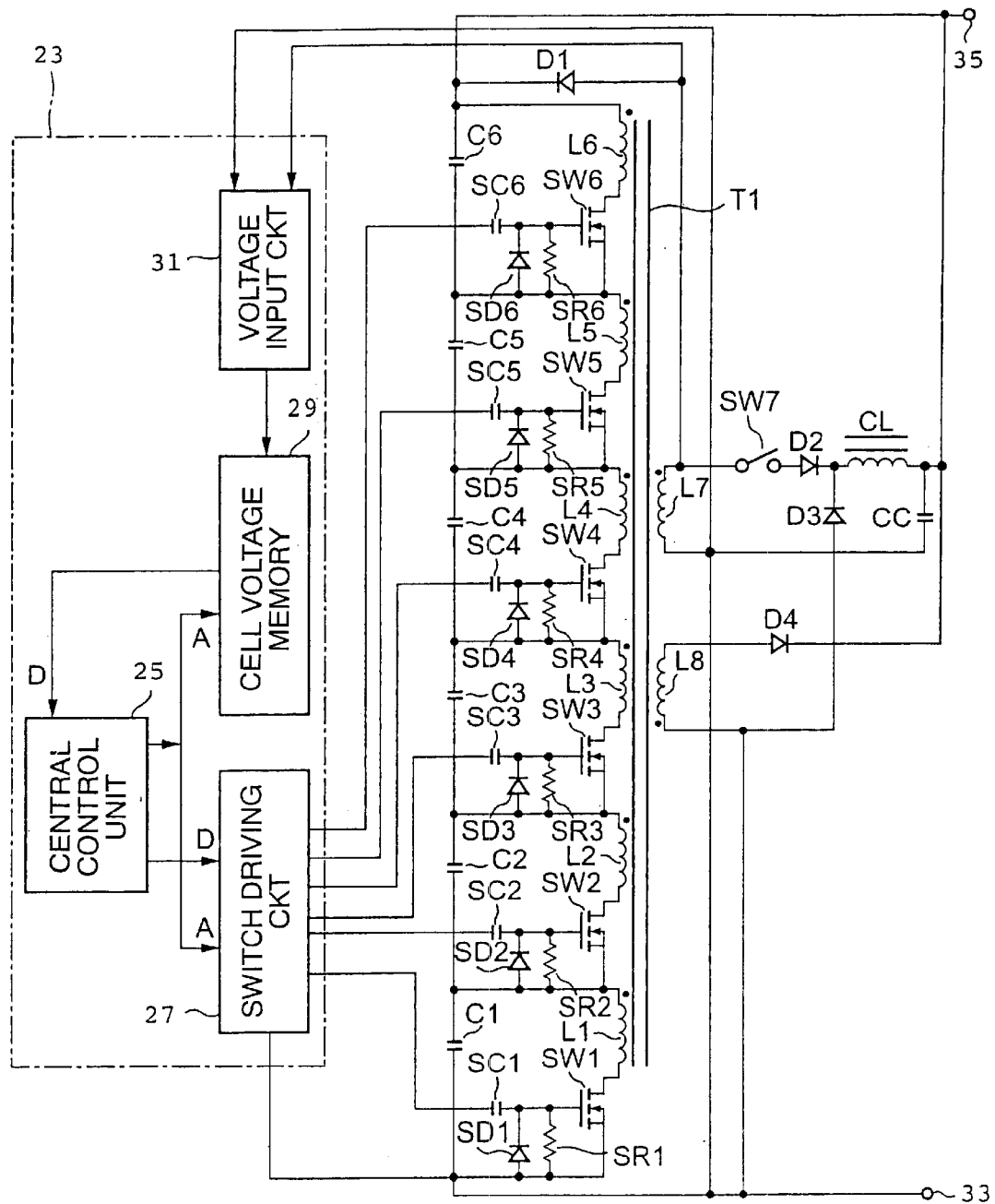
FIG. 2 is a circuit diagram showing a unit energy storage device of a second embodiment of this invention, the unit energy storage device having a cell energy adjustment device using a forward converter, to perform driving with use of the input/output terminals of FIG. 1 as a return line.

In the circuit example using a forward converter according to the second embodiment of this invention shown in FIG. 2, operations similar to those described above are also valid, but a switching circuit SW7 must be additionally provided in series with the power rectifier D1 connected to secondary coil L7 of the first transformer T1 so as to turn off the circuit of the second coil L7 in sync with the cell voltage measurement interval. In a case where the power rectifier D1 is a synchronous rectifier, performing synchronization control enables to omit the switching circuit SW7.

The switches SW1 through SW6 in FIG. 1 and FIG. 2 can comprise MOS transistors, and on-off operation of the switch is controlled by applying signals to the gate.

In FIG. 1, gate driving transformers (second transformers) ST1 through ST6 are used to isolate the control circuit 7 from the potential due to series connection of the electrical double-layer capacitors. In FIG. 2, in place of the gate driving transformers (second transformers) ST1 through ST6 of FIG. 1, gate driving capacitors SC1 through SC6 are used for gate signal transmission. Either terminal of the electrical double-layer capacitors may be used as feedback. Here, terminal 33 is selected for feedback.

Whereas in general, changes in the cell terminal voltage are gradual and the switching frequencies of the switching transistors SW1 through SW6 are high, so that by appropriately selecting values for the gate driving capacitors SC1 through SC6 and resistances SRI through SR6, the control circuit 23 can be isolated from the potential of series connection of the electrical double-layer capacitors.

For example, if the capacitance of the gate driving capacitors SC1 through SC6 is 1 nF, and if the resistance of the resistances SR1 through SR6 is 100 kΩ, then the time constant is 0.1 msec, and so switching operation can be performed at about 100 kHz, with a cycle of 10 μsec. On the other hand, if the upper limit for changes in the cell voltage is 0.1 Hz, then the effects of DC potential fluctuations will not extend to the control circuit 23.

The circuit using a forward converter in FIG. 2 is desired because losses due to the diode $V_F$ be reduced by connecting a reset coil to terminals at a voltage higher than the cell voltage in recovering the magnetization energy of the transformer core.

Provision of a reset coil on the primary side of a transformer is accompanied by the disadvantage of an increase in the number of coils and the number of diodes.

Figure 3:
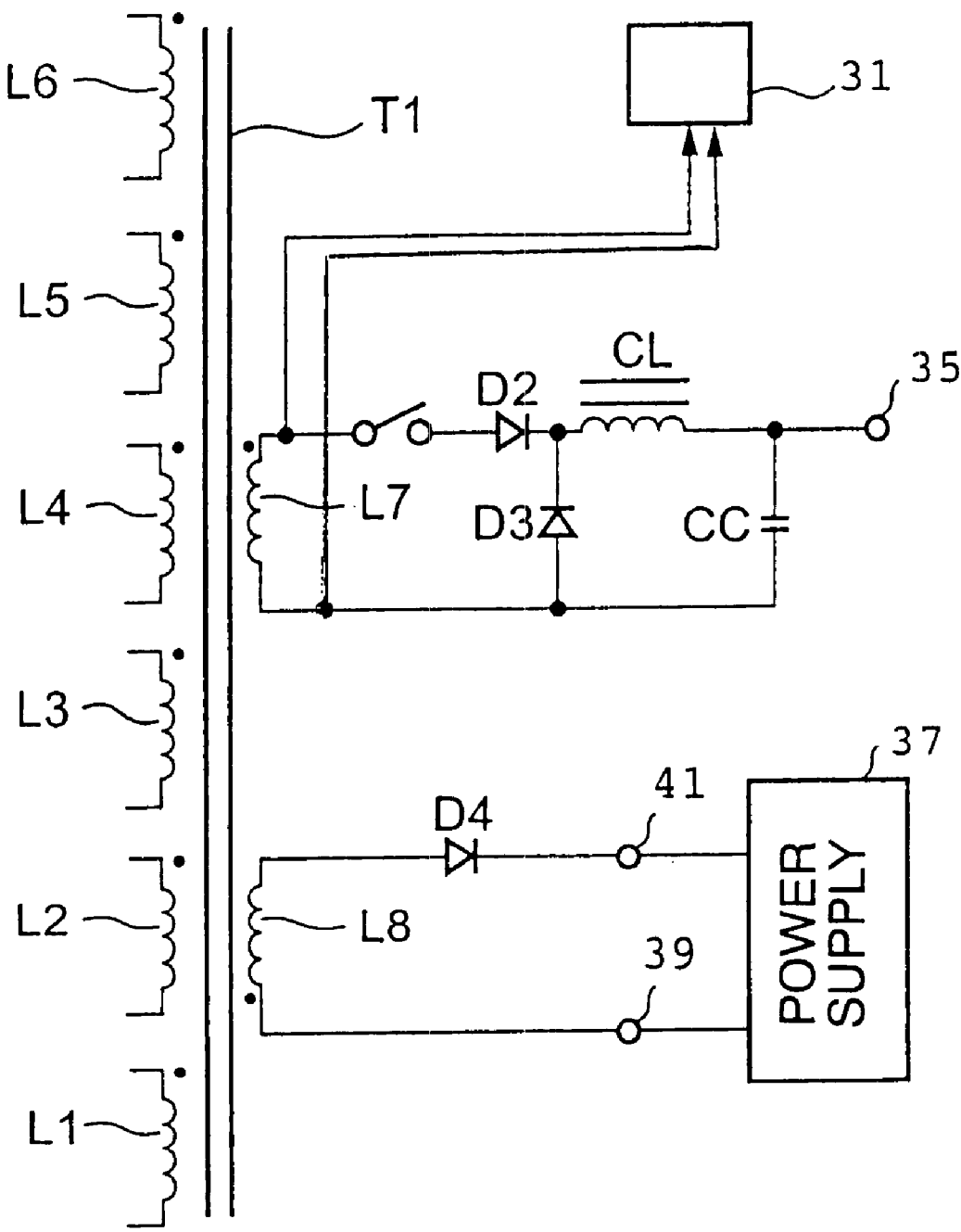
FIG. 3 is a circuit diagram showing a cell energy adjustment device using a forward converter which recovers energy to a constant-potential terminal, according to a third embodiment of this invention.

Hence, it is also effective for recovery to select, as the location for connection of the secondary coil L7 of the energy transfer transformer T1 (first transformer) which is the destination for energy recovery, the control circuit 23, as well as the output terminals 39 and 41 of the power supply 37 supplying power to the auxiliary circuit, as in the third embodiment of this invention shown in FIG. 3.

As the number of electrical double-layer capacitors forming the unit energy storage device increases, the number of primary-side coils L1, L2, . . . of the energy transfer transformer T1 also increases, so that the efficiency of the transformer declines and optimal design becomes difficult.

Figure 4:
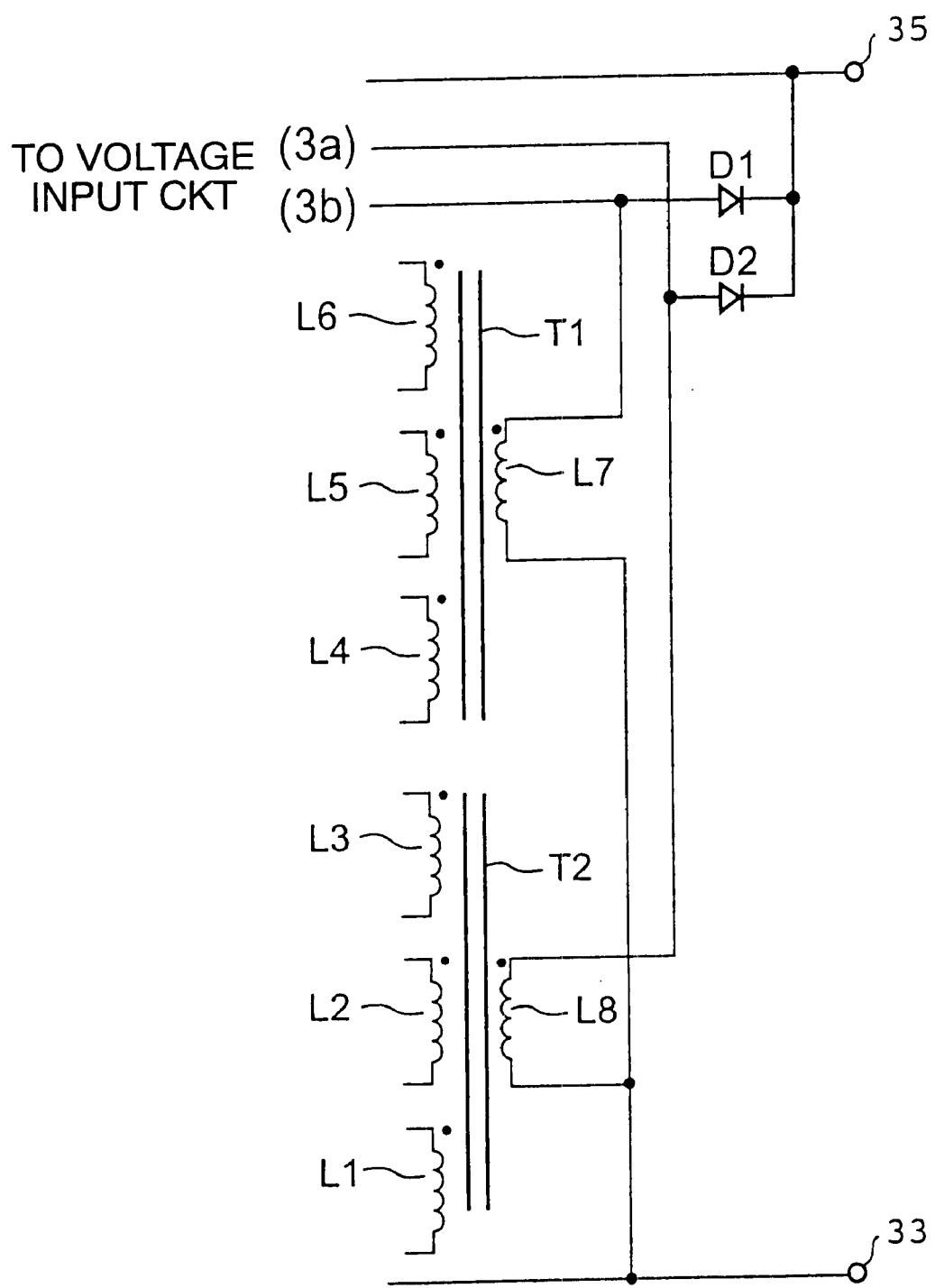
FIG. 4 is a circuit diagram showing a cell energy adjustment device, by which two modules, each with three electrical double-layer capacitors, are connected to serve as a single unit energy storage device, in a fourth embodiment of this invention.

Referring to FIG. 4, the fourth embodiment shown therein is also effective where a unit energy storage device comprises, for example, two first transformers T1 and T2 and six electrical double-layer capacitors arranged in such a form as every three electrical double-layer capacitors are connected to each of the transformers T1 and T2 having three primary-side coils L1, L2 and L3 and L4, L5 and L6, respectively. In consideration of the circumstances and costs of electronic parts, it is of course possible to make a unit energy storage by three transformers having two primary-side coils and six electrical double-layer capacitors.

Figure 5:
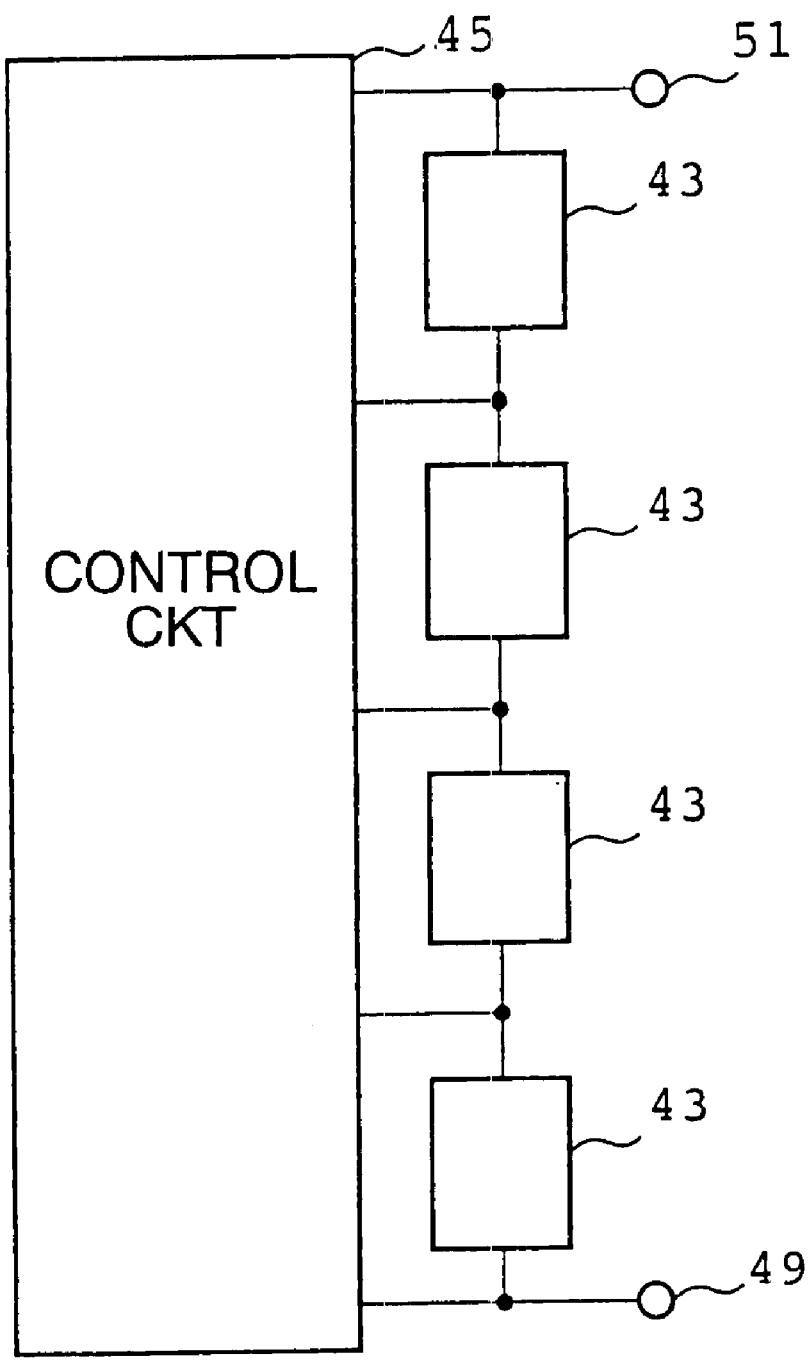
FIG. 5 is a circuit diagram showing a large-capacity energy storage device, in which four unit energy storage devices are connected in series, in a fifth embodiment of this invention.

Referring to FIG. 5, an energy storage device according to a fifth embodiment shown therein comprises a plurality of unit energy storage devices 43 configured in this way which are further connected in series to each other. This configuration can provide an energy storage device with larger capacity. A plurality of energy storage devices with energy storage amounts increased in this way can be connected in a multistage and further expanded in a desired layer structure so as to obtain the desired energy storage amount. The symbol 45 denotes a control circuit with configuration similar to the control circuit 23.

Next, description will be made as regards operation of the cell energy adjustment device of the unit energy storage devices according to the first through fifth embodiments of this invention.

In essence, the cell energy adjustment device comprises the control circuit 23 or 45 as means for normalizing energy amount which measures the voltages of the respective cells in response to either one of a time-limiting signal from a timer or to a charge/discharge state, operates a switching circuit connected to any one of cells judged to have an excessive terminal voltage, and continues the operation until the amount of energy stored in the cell in question reaches a right value.

Figure 6:
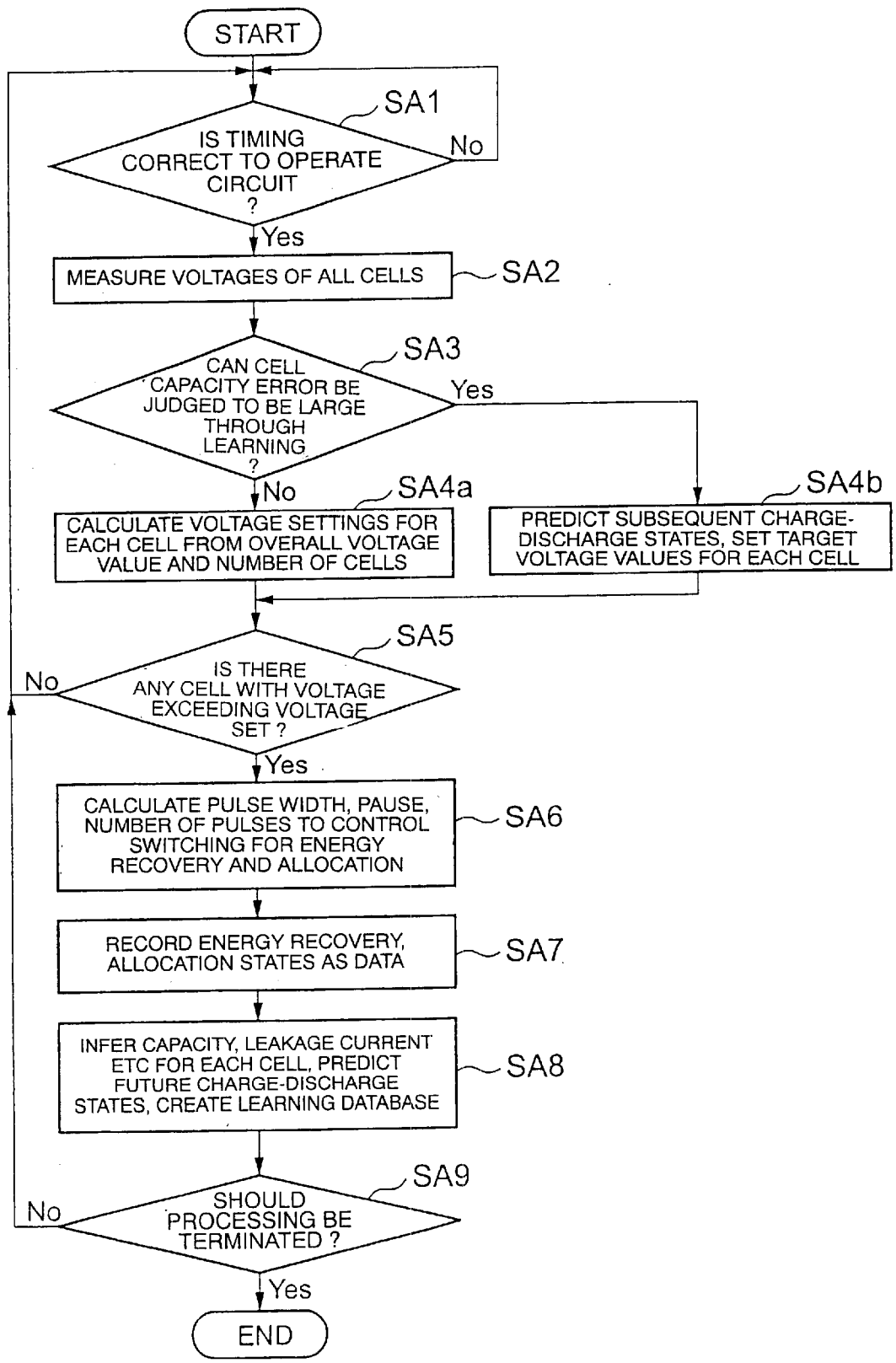
FIG. 6 is a flow chart showing the operation of a control circuit in the first through fifth embodiments of this invention.

Specifically, the control processing of the control circuit 23 or 45 is carried out according to, for example the flow chart shown in FIG. 6. FIG. 6 shows a flow chart of the operation of the control circuits in FIG. 1 through FIG. 5.

Referring to FIG. 6, upon starting, first a judgment is made as to whether the timing is correct to operate the circuit (step SA1). If the timing to operate the circuit is not correct (NO), execution returns to the beginning. If the timing is correct for circuit operation (YES), the voltages of all cells are measured (step SA2).

Next, a judgment is made by means of learning as to whether the capacity error of each cell is large (step SA3). If the capacity error of each cell is judged large (YES), a target voltage value is set for each cell under a forecast of the charge/discharge state in future (energy allocation circuit, step SA4b). On the other hand, if it is not judged large (NO), then a voltage value set to each cell is calculated from the overall voltage value and the number of cells (step SA4a). In either case, judgment is then performed as to whether there is any one of cells having voltage exceeding the voltage values set (step SA5).

If there is no cell which exceeds the voltage value set (NO), execution returns to the beginning. If there is any one of cells which exceeds the voltage value set (YES), the pulse width, pause, and number of pulses for switching control to recover and allocate energy are calculated (step SA6).

Next, the conditions of the energy recover and allocation are recorded as data (step SA7).

Next, the charge/discharge state in future is predicted under consideration of the capacity, leakage current and other parameters of each cell, and a learning database is created (step SA8).

Finally, a judgment is performed as to whether processing should be terminated (step SA9), and if it is judged that processing should not be terminated (NO), execution returns to the beginning, and processing is repeated. If it is judged to be terminated (YES), execution is halted.

In the embodiment of this invention explained above, all the switching signals of the switch driving circuit 27 may be output simultaneously, in order to attain the simple object of rendering the cell voltages of the electrical double-layer capacitors equal to each other. By this means, the energy of any one of the electrical double-layer capacitors which has a high voltage can be automatically recovered by an amount higher than that of other electrical double-layer capacitors to the entirety.

In the above explanation, the cell energy adjustment device is configured using electrical double-layer capacitors, but of course the cell energy adjustment device can also be configured with secondary batteries as cells.

As explained above, the first through fifth embodiments of this invention can provide an energy storage device having a plurality of cells connected in series to constitute one unit, which is provided with a cell energy adjustment device adapted to maintain the energy amount stored in each of the cells in the unit energy storage device at an optimal target value without energy loss in principle, whether during charging, discharging, or standby, by transferring energy stored in an arbitrary one of cells within the unit to the input/output terminals of the energy storage device therefrom.

Next, explanation will be made as to the electrical energy storage device, cell energy adjustment device, and cell energy adjustment method according to sixth and seventh embodiments of this invention.

Figure 7:
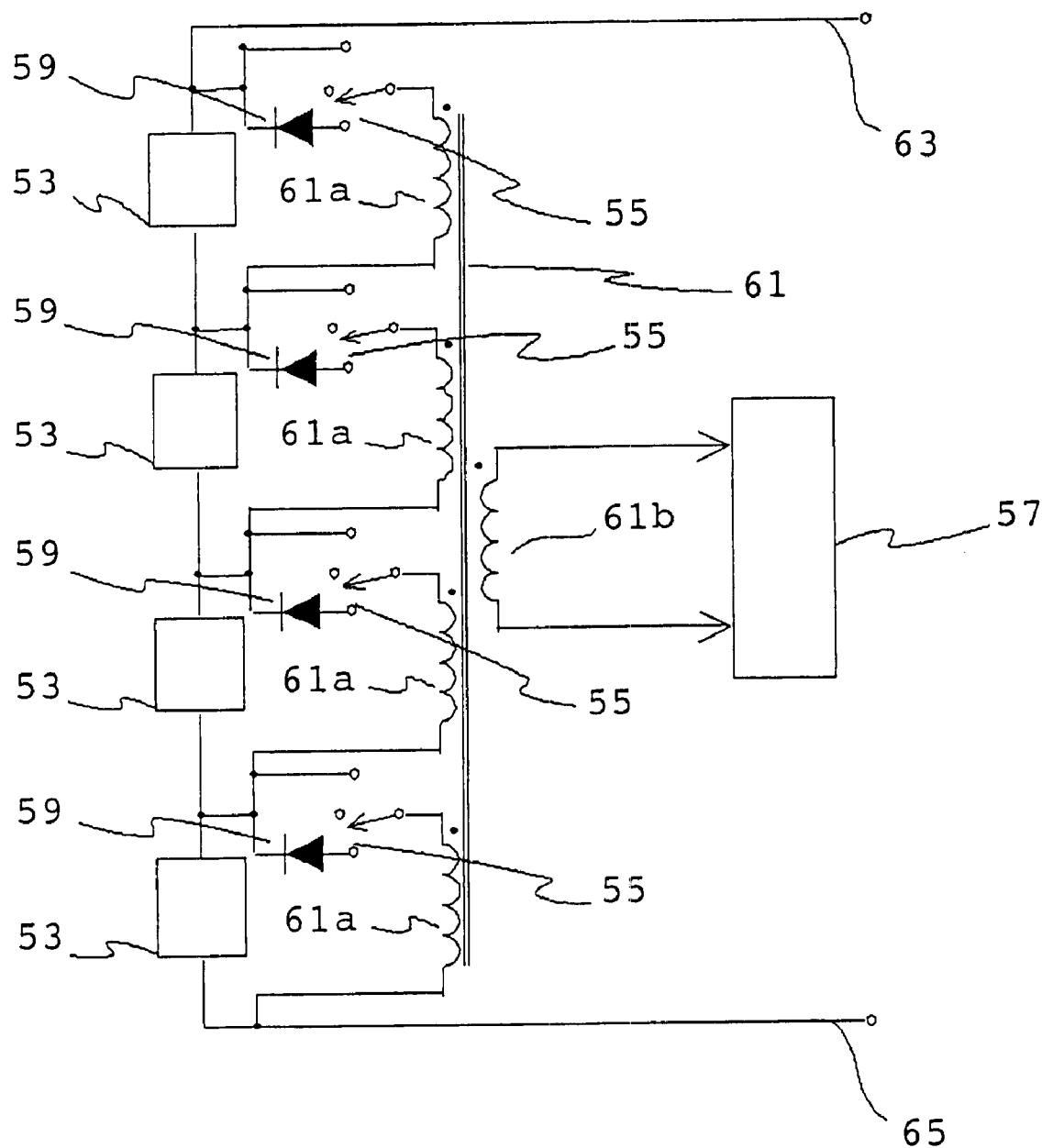
FIG. 7 is a diagram showing an electrical energy storage device composed of four energy storage devices and comprising the cell energy adjustment device according to the sixth embodiment of this invention.

Referring to FIG. 7, the electrical energy storage device of the sixth embodiment of this invention comprises a cell energy adjustment device and four energy storage devices 53. Hereinbelow, the electrical energy storage device is one which comprises a plurality of energy storage devices, each of the energy storage devices comprising a plurality of unit energy storage devices. Each of the unit energy storage devices comprises a single capacitor or a plurality of capacitors.

Energy storage devices 53 are connected in series to each other in order to increase the amount of energy accumulated, and in order to raise the voltage of the overall electrical energy storage system, each of the energy storage devices 53 is connected with coil 61a, respectively, through which it transfers its energy to other energy storage devices 53 via a switching circuit 55, and receives of the transfer from other storage devices 53. Here, all of the coils 61a are shown as components of a single transformer 61 but could be handled as separate components in several transformers used when there are numerous energy storage devices.

After turning off all switching circuits 55, one of the switching circuits 55 connected to one of the energy storage devices 53 intended to be measured in voltage is turned on to induce a-voltage in the secondary coil 61b of the transformer 61. From this induced voltage, the energy amount accumulated can be measured. The switching circuits 55 are sequentially operated to measure energy amounts for all of the energy storage devices 53 by the voltage input circuit 57, which amounts are stored in the memory of the control device, optimal energy reallocation being performed from the data stored. Specifically, energy is removed from one of the energy storage devices 53 having a higher voltage and is allocated to another of the energy storage devices 53 having a lower voltage, that is, with a small energy amount.

Figure 11:
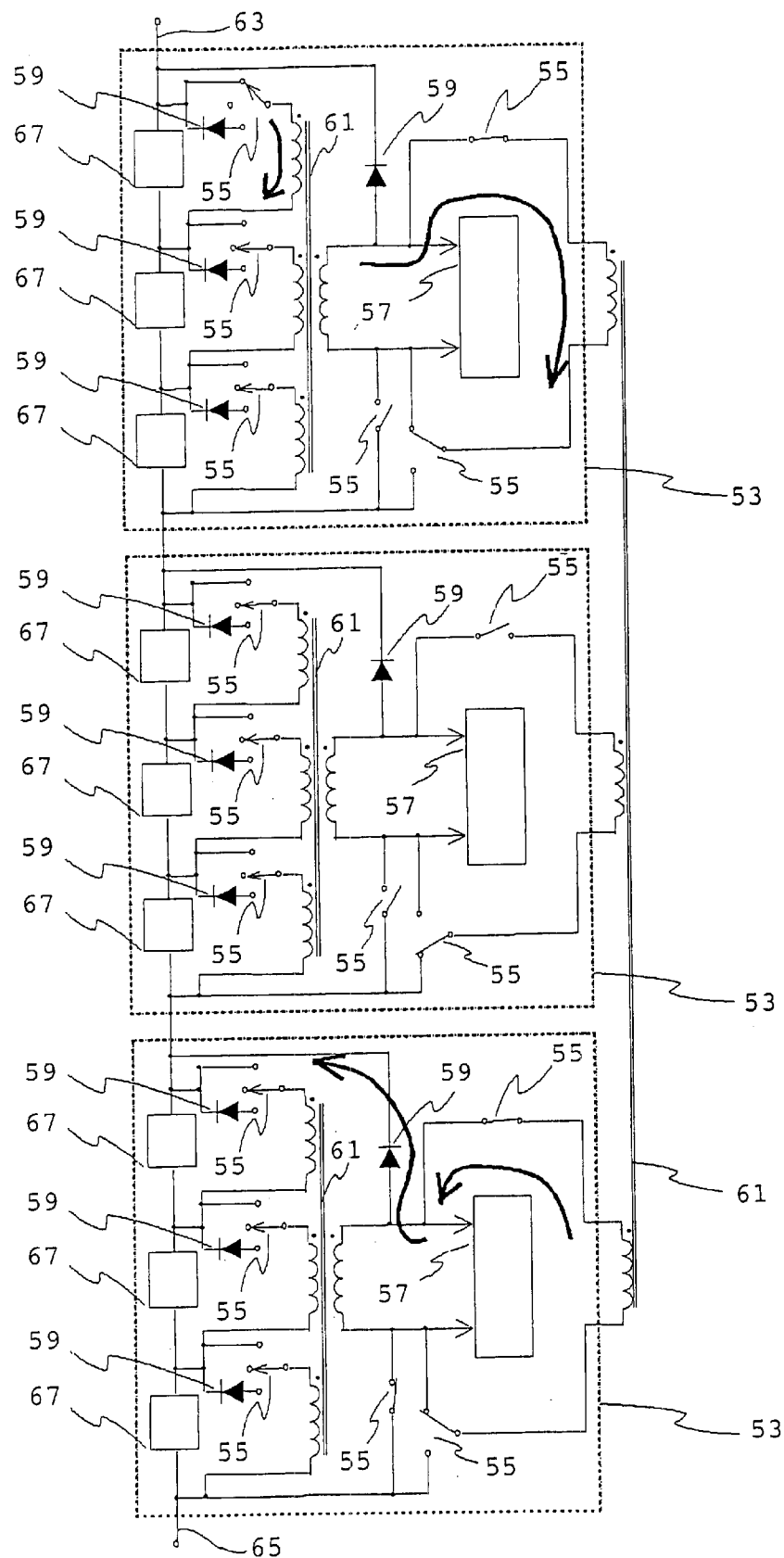
FIG. 11 is a diagram showing energy transfer example 1 for an electrical energy storage device comprising three energy storage devices connected in series, each comprising three unit energy storage devices connected in series, and comprising a cell energy adjustment device according to this invention.

In actual operation, one of the switching circuits 55 corresponding to one of the energy storage devices 53 to be removed with energy is turned on, and another of the switching circuits 55 corresponding to another of the energy storage devices 53 to be allocated with energy is connected to a corresponding one of the rectifiers 59, while the remaining switching circuits 55 are turned off. For example, if the first one of the energy storage devices 53 is high in the voltage while the third one of the energy storage devices 53 is low in the voltage, then the switching circuits 55 are connected as shown in FIG. 11. Since the amount of energy transferred by one switching action is normally smaller than the desired energy amount of energy required, ON and OFF operations of the switching circuit 55 corresponding to the first energy storage device 53 is repeated by a plurality of times to transfer the desired energy amount.

By means of such operation, the voltages of a plurality of energy storage devices 53 can be made equal, and as a result the overall energy amount of the electrical energy storage system can be made large. When it is assumed that each of the energy storage devices 53 comprises a single capacitor with a withstand voltage of from 1 V to 3 V the voltage drop across the rectifier 59 cannot be ignored in the configuration shown in FIG. 7, because the rectifier 59 usually comprises a diode having a forward voltage Vf of 0.7 V.

In the case, the energy removed is raised in voltage by a transformer 61, and the energy is distributed to the entire electrical energy storage system. This is effective for ignoring the Vf of the rectifier. However, if the energy is distributed to the entire, the energy is partially returned to the energy storage device 53 having the larger amount of energy, resulting that all of the energy removed is not utilized for the equalization.

In the sixth embodiment of this invention, the energy allocation is not to the entire electrical energy storage system but to the individual energy storage devices 53 when the unit of energy transfer is enlarged, so that rapid and efficient energy transfer can be realized.

In the embodiment, the forward type has been used for the energy transfer. However, the backward-type energy transfer may also be employed by configuration of the switching circuit 55 and rectifier 59 into a bridge-type.

Figure 13:
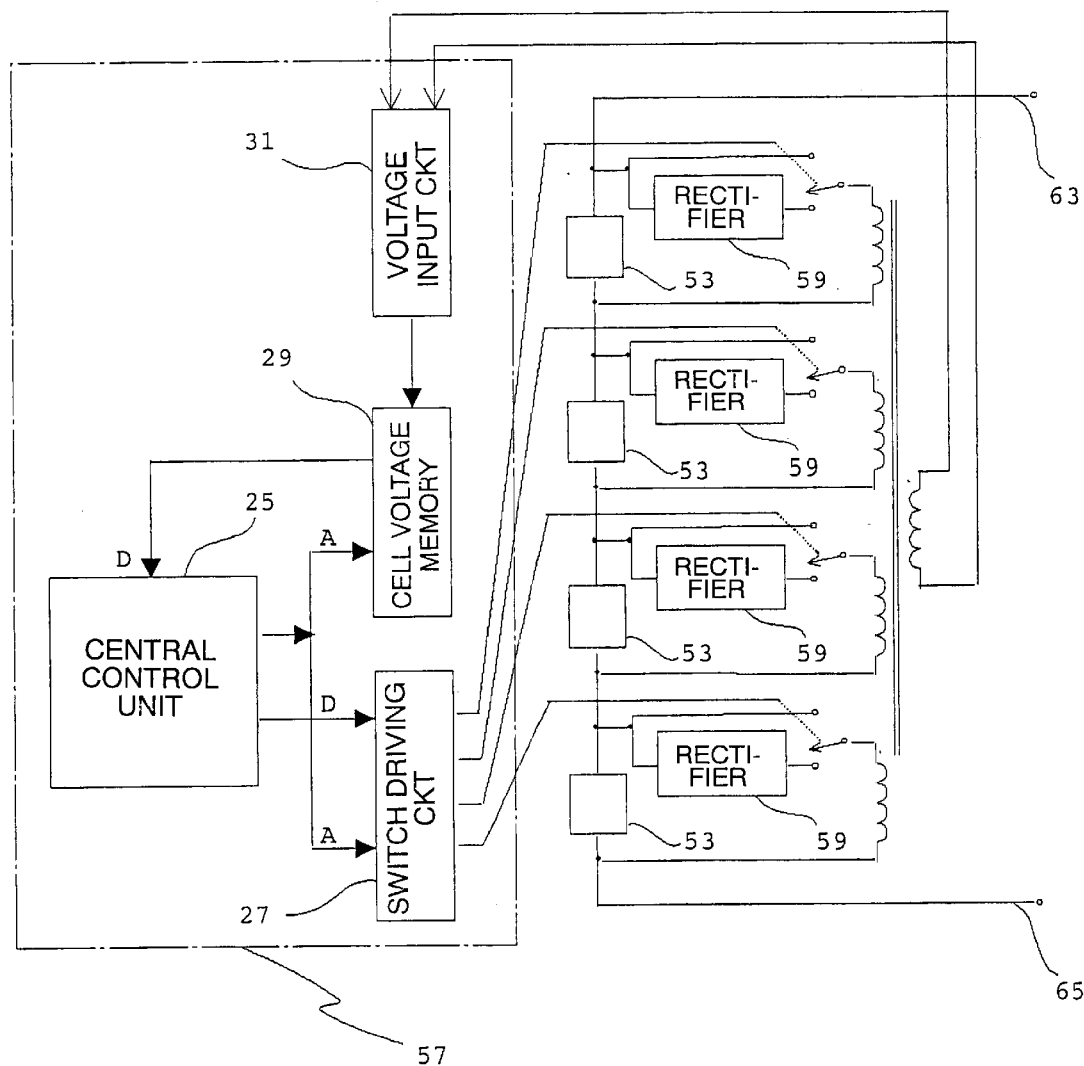
FIG. 13 is a diagram showing a representative example of a block diagram of an energy storage device comprising a cell energy adjustment device according to this invention.

The electrical energy storage device shown in FIG. 7 can be applied to the block diagram of FIG. 13.

Figure 8:
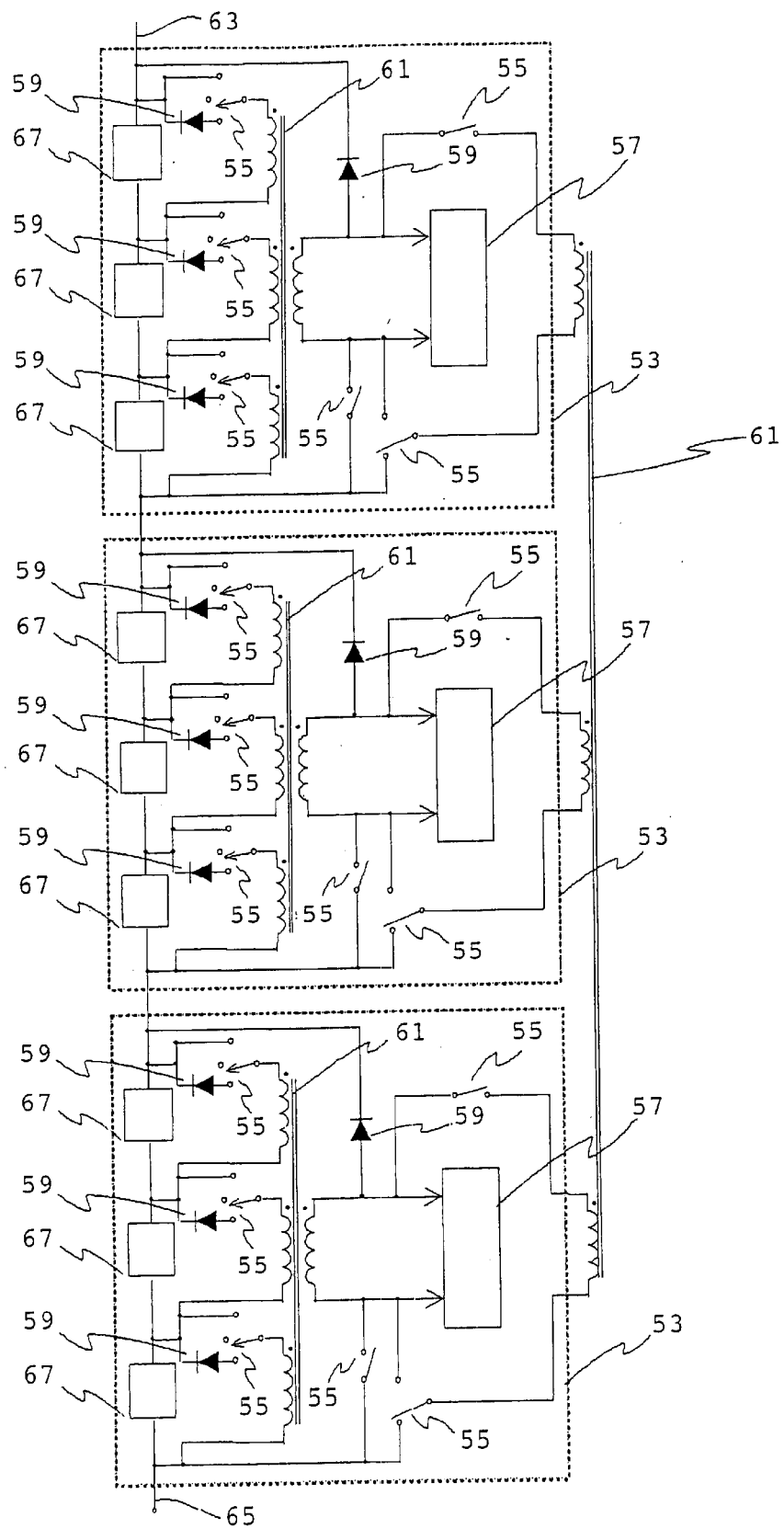
FIG. 8 is a diagram showing an electrical energy storage device, composed of three energy storage devices connected in series, each comprising three unit energy storage devices connected in series, and comprising the cell energy adjustment device according to the seventh embodiment of this invention.

Referring to FIG. 8, the electrical energy storage device according to the seventh embodiment of this invention is configured by connecting in series three energy storage devices 53 each comprising a cell energy adjustment device and three unit energy storage devices 67 connected in series to each other.

In the seventh embodiment of this invention, energy can be transferred from one of the unit energy storage devices 67 to another of the unit energy storage devices 67. Energy can also be transferred from one of the unit energy storage devices 67 to one of the energy storage devices 53 other than another containing the one unit energy storage device 67.

For example, FIG. 11 shows connections of the switching circuits 55 for the case in which energy is transferred from a first one of the unit energy storage devices within a first one of the energy storage devices to the entire of the third one of the energy storage devices.

Figure 12:
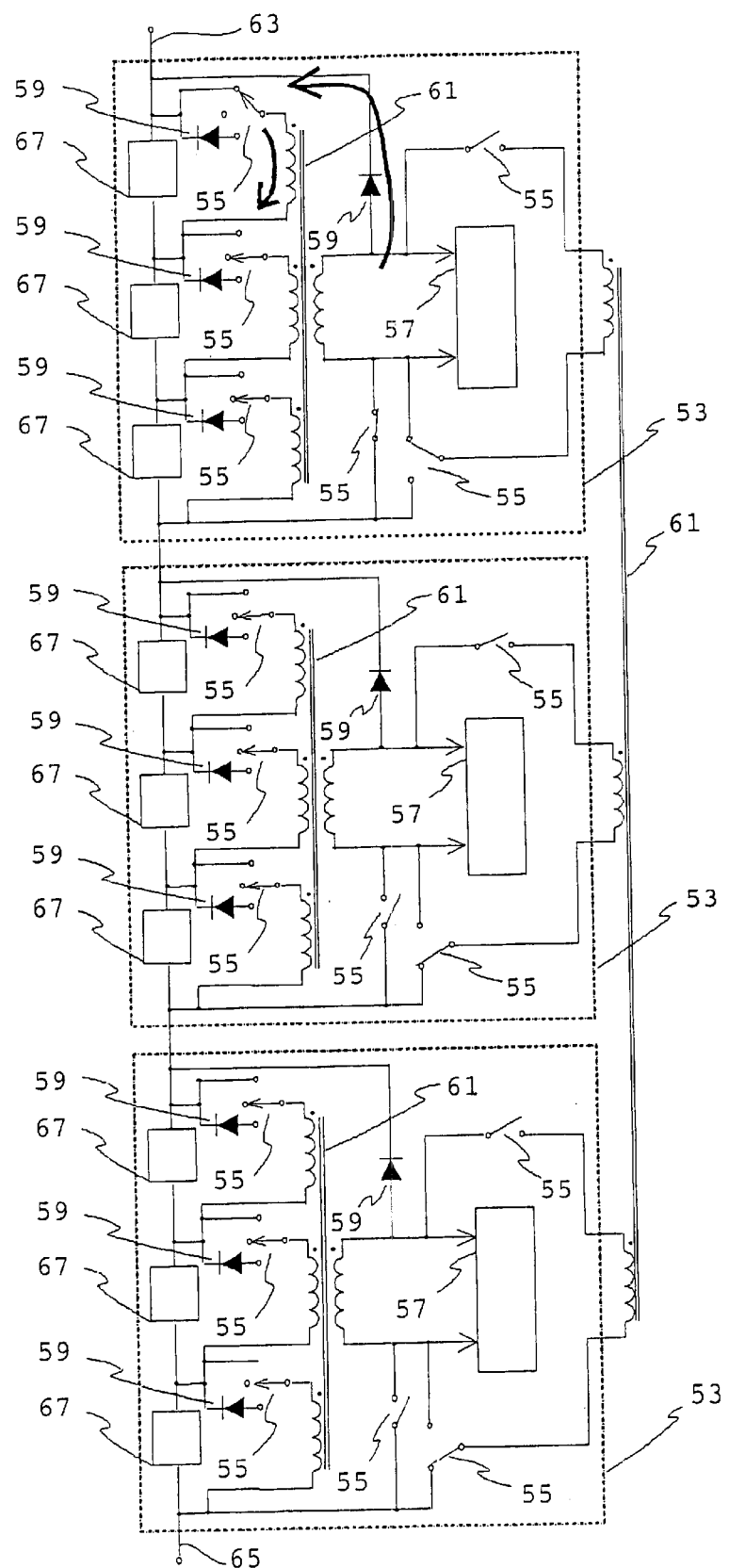
FIG. 12 is a diagram showing energy transfer example 2 for an electrical energy storage device comprising three energy storage devices connected in series, each comprising three unit energy storage devices connected in series, and comprising a cell energy adjustment device according to this invention.

For further example, FIG. 12 shows the connections of the switching circuits 55 for the case in which energy is transferred from a first one of the unit energy storage devices within a first one of the energy storage devices to the entire of the first one energy storage device. In these cases, the flow of current is shown by the thick arrow lines in FIG. 11 and FIG. 12. Each of the energy storage devices 53 has a voltage input circuit 57 therein for acquiring the energy amount data of the unit energy storage devices 67, which data may be batch-processed to control all of the switching circuits 55. Alternatively, the energy storage devices may have control devices, respectively, while transfer of energy among three energy storage devices may be performed by another control device dedicated therefor.

Figure 14:
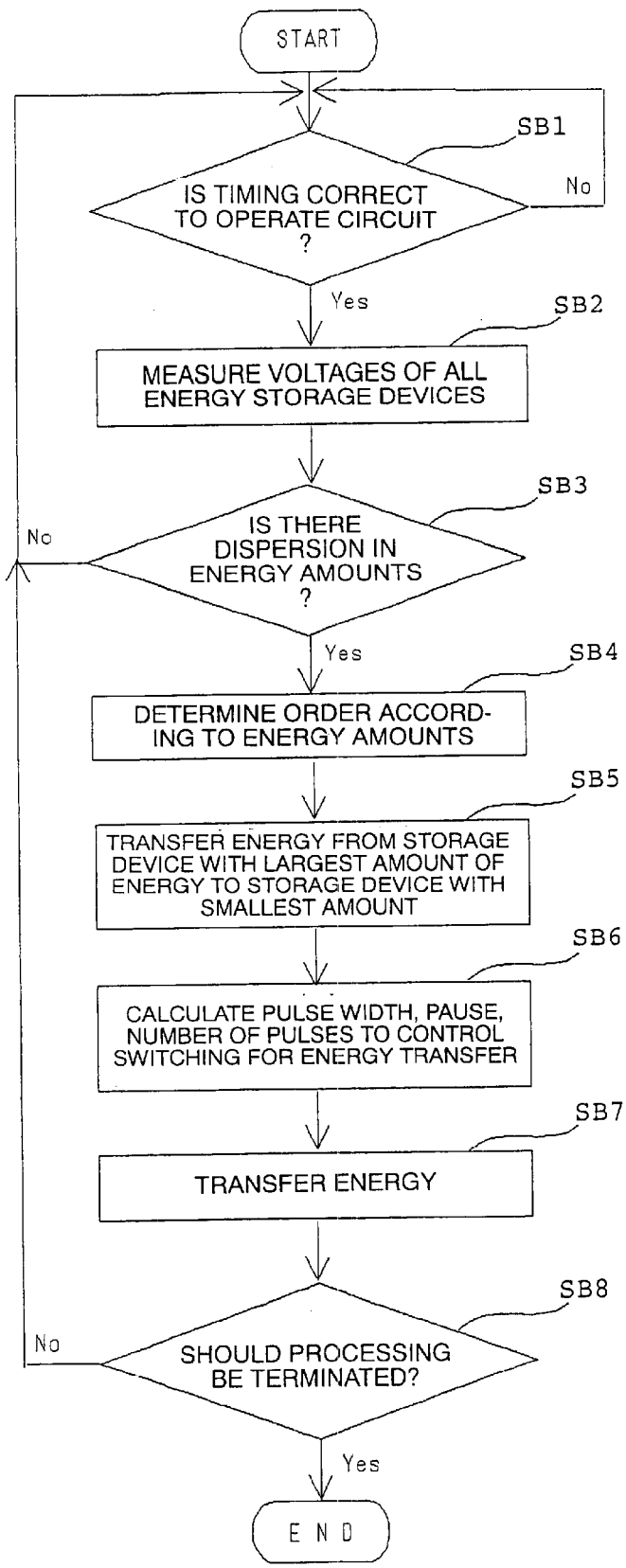
FIG. 14 is a diagram showing a flow chart during operation of a cell energy adjustment device according to this invention.

Referring to FIG. 14, operation of the cell energy adjustment device explained above is performed according to the flow chart shown therein.

Specifically, upon starting, a judgment is firstly performed as to whether the timing is correct to operate the circuit (step SB1). If the result is "NO", execution returns to this stage. If it is "YES", the voltages of all of the energy storage devices are measured (step SB2). Next, a judgment is performed as to whether energy amounts stored in the energy storage devices have dispersion (step SB3). If "NO", execution returns to step SB1. If "YES", the energy storage devices are numbered in the order according to energy amounts thereof (step SB4). Next, energy is transferred from one of the storage devices having the largest amount of energy to another of the storage devices having the smallest amount of energy (step SB5). Then, the pulse width, pause, and number of pulses are calculated for switching control to transfer energy (step SB6). Then, energy is transferred (step SB7). Finally, a judgment is performed as to whether operation should be terminated (step SB9). If "YES", operation is terminated, but if "NO", execution again returns to step SB1.

By increasing the number of layers in the configuration where the electrical energy storage device comprises a plurality of energy storage devices each having a cell energy adjustment device, each of the energy storage devices comprising a plurality of energy storage devices having cell energy adjustment devices, a still larger storage system can be configured. In the case, this invention is applied thereto similarly, and energy transfer can thereby be done with the same efficiency.

Figure 9:
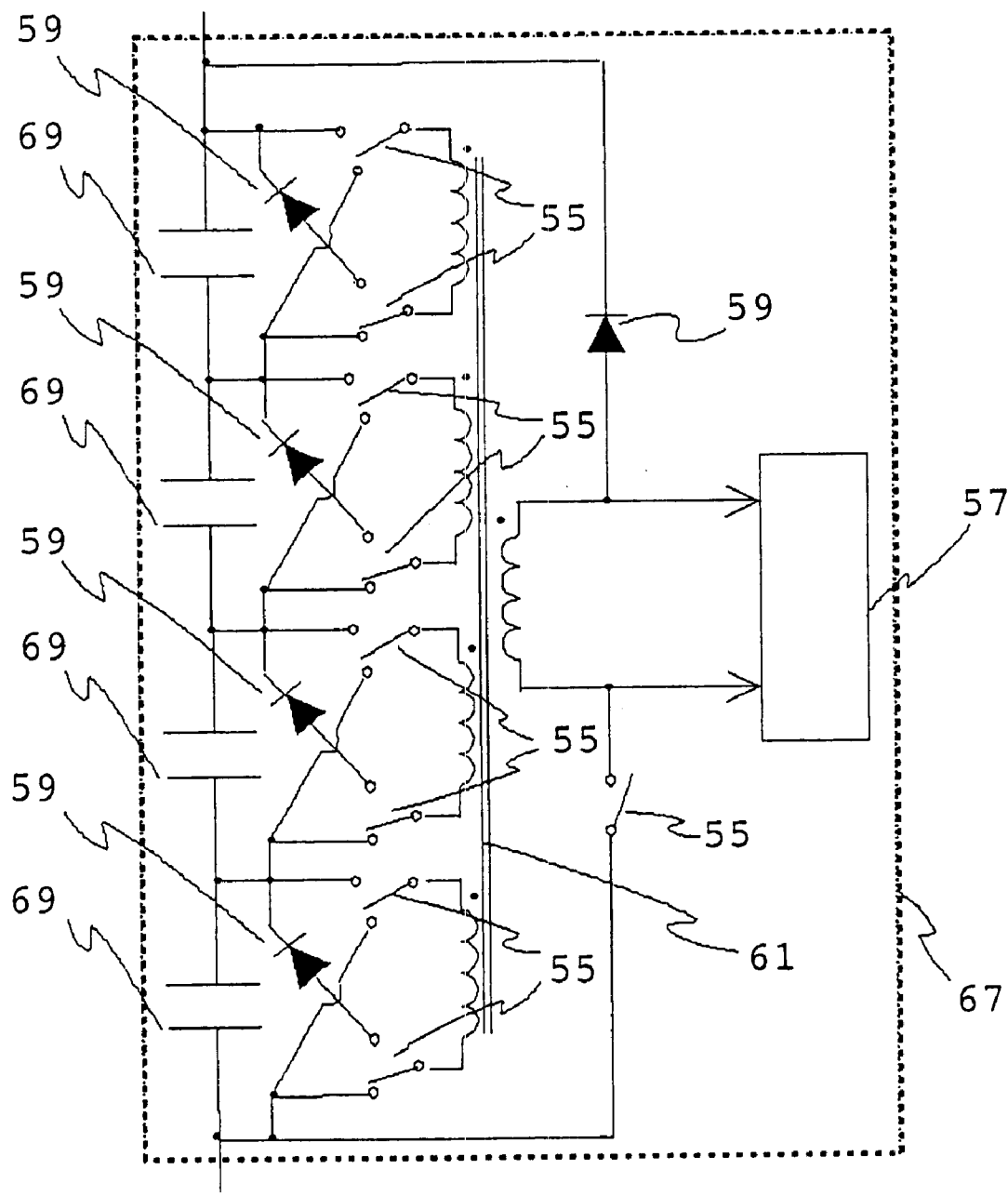
FIG. 9 is a diagram showing a unit energy storage device comprising four capacitor cells according to this invention.
Figure 10:
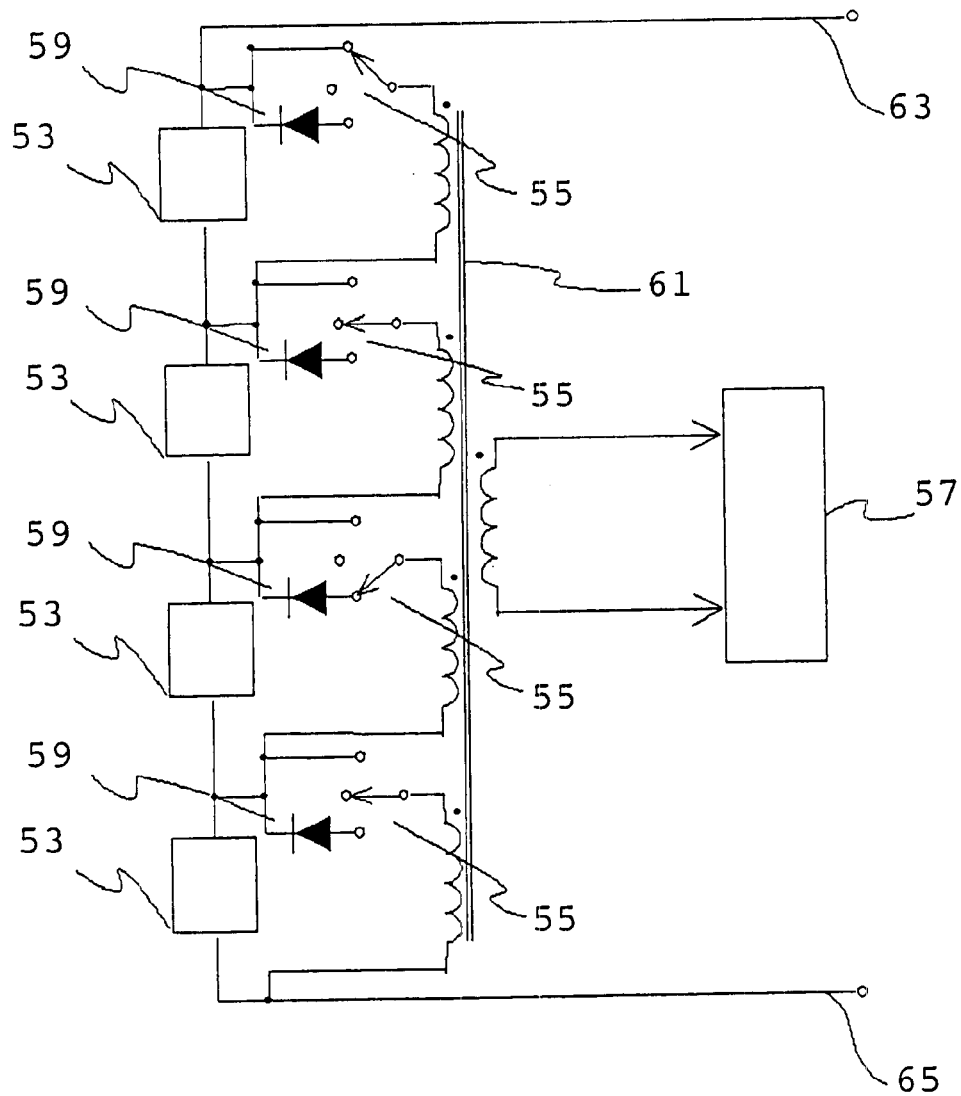
FIG. 10 is a diagram explaining the configuration the case of transfer of energy from the first energy storage device to the third energy storage device, in an electrical energy storage device comprising four energy storage devices, and comprising a cell energy adjustment device, according to this invention.

Referring to FIG. 9, the unit energy storage device 67 comprises four capacitor cells 69. This unit energy storage device 67 can operate in the similar manner to the electrical energy storage system of FIG. 7.

However, each of the capacitor cells 69 generally has a terminal voltage of from 1 V to 3 V, which is not sufficiently high in comparison with the forward voltage Vf of the rectifiers 59, the loss of which cannot be ignored. In actual use, energy transfer between capacitor cells 69 is not useful, but it is desired to transfer energy to the terminals of the unit energy storage device 67. The circuit shown in FIG. 9 is configured so that either of them can be selectively used. Although the cell energy adjustment device in FIG. 8 explained above uses a forward type of energy transfer while the unit energy storage device of FIG. 9 using a backward type for configuration of the circuit, it is of course that either one of those types can be used in this case.

In this way, the sixth and seventh embodiments of this invention can provide the electrical energy storage device, the cell energy adjustment device, and a cell energy adjustment method in which energy transfer is enabled between energy storage devices in a cell energy adjustment device comprising a plurality of energy storage devices connected in series with each other, and it is also possible to transfer the energy from one of the unit energy storage devices forming one of the energy storage devices to another of the unit energy storage devices or to the other of the energy storage devices, and which thereby have means for efficiently maintaining the amount of energy of the system at an optimal target value without losses accompanied in principle.

Next, eighth through tenth embodiments of this invention are explained.

As stated above, in order to operate an energy storage device comprising a plurality of electrical energy storage cells connected to each other, a cell energy adjustment device is useful which comprises a mechanism for managing the energy amounts of respective cells and reallocating energy, as a novel cell voltage smoothing device.

In the basic configuration of the cell energy adjustment device according to the above-described first through fifth embodiments, FETs connected as switching elements to the respective capacitor cells are sequentially turned on to measure the voltages of respective capacitor cells, then the control device recording the voltage induced on a secondary coil. As a result, when the voltage of, for example, a second one of the capacitor cells is higher than the voltages of the other capacitor cells, that is, when the energy amount of the second capacitor cell exceeds the energy amounts of the other capacitor cells, control is exercised to turn the FET connected to the second capacitor cell on and off to thereby transfer energy to all the capacitors connected in series via a secondary coil and a power diode. By repeating these operations, the voltages of respective capacitor cells can be made equal to each other, and the total amount of energy stored can be increased. In practical use of this device, a plurality of energy storage devices, each having a plurality of cells connected in series, are connected in series, and the device is operated with the total amount of energy raised.

The transfer of energy by the above-mentioned cell energy adjustment device is made to the entirety of the capacitor cells in order to reduce the loss at the rectifiers as much as possible. At that time, a voltage is induced on the coils connected to the other capacitor cells other than the capacitor cell connected to the switching circuit which is turned on, so that when FETs are used as the switching circuits, energy is exchanged between capacitor cells if a voltage difference between capacitor cells is equal to or greater than the forward voltage of the parasitic diode. At the time, loss is caused due to the FET parasitic diodes. Therefore, adjustment of the energy amount of each capacitor cell must be performed with a timing when voltage differences between capacitor cells do not exceed the diode forward voltages. Considering the losses during turn-on, it is preferable that a MOSFET be used for the switching circuit, so that there are conflicting problems.

Hence, these inventors devised means of preventing the energy exchange between cells caused due to the effect of FET parasitic diodes in the switching circuit using FETs in the cell energy adjustment device which comprises a plurality of capacitor cells or secondary battery cells connected in series and a mechanism for transferring from any one of the cells the energy charged in the cell.

Figure 15:
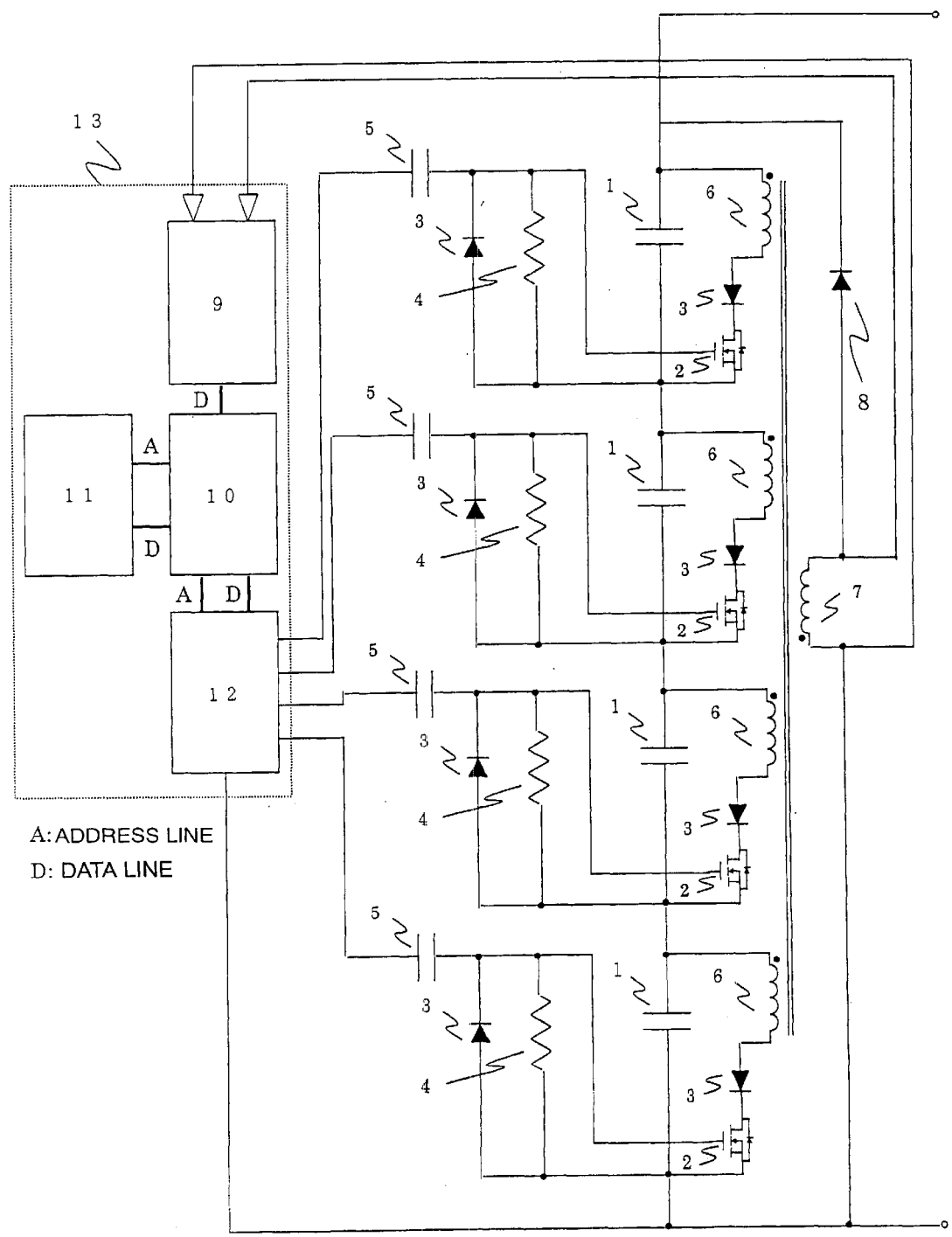
FIG. 15 is a diagram showing an energy storage device according to an eighth embodiment of this invention.

FIG. 15 shows a unit energy adjustment device comprising four capacitor cells 1 connected in series to each other according to an eighth embodiment of the cell energy adjustment device of this invention. Each of the capacitor cells 1 is connected in series to FET 2 and diode 3 via the primary coil 6 of a transformer. When the voltage difference between capacitor cells is smaller than the forward-direction voltage of the parasitic diode of the FET 2, adjustment of the energy amount can be performed by the same operation as in FIG. 2.

However, when the voltage difference between capacitor cells is greater than the forward-direction voltage of the parasitic diode of the FET 2, current also flows through FET 2 (SW1–SW2) connected to one of capacitors having the lower voltage in the cell energy adjustment device of FIG. 2, resulting in increase of loss. Thus, connection of diode 3 in series with FET 2 as shown in FIG. 15 can prevent energy transfer between capacitor cells.

Figure 16:
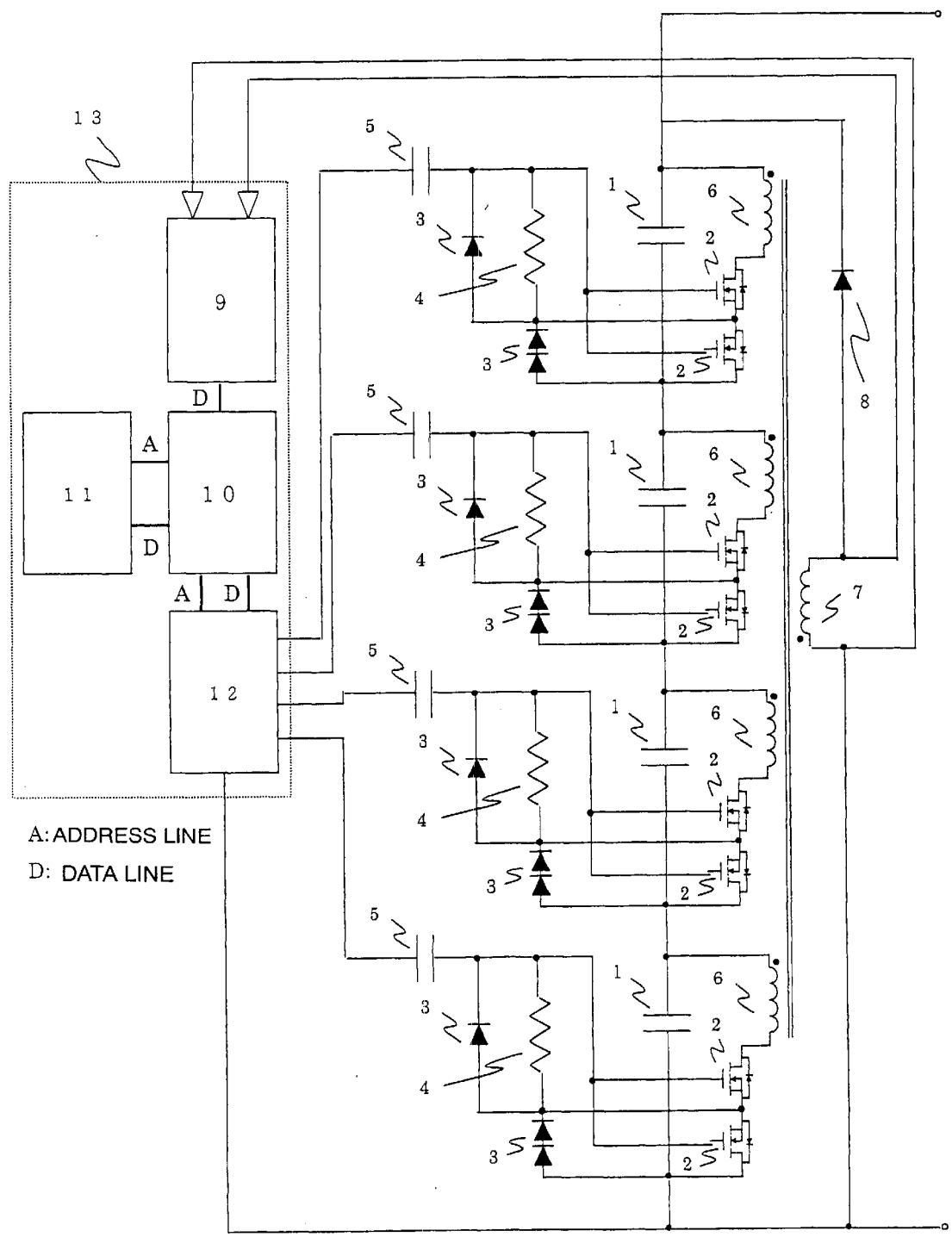
FIG. 16 is a diagram showing an energy storage device according to a ninth embodiment of this invention.

FIG. 16 shows an energy adjustment device comprising four capacitor cells 1 connected in series to each other according to a ninth aspect of a cell energy adjustment device of this invention. Each capacitor cell 1 is connected to a primary coil 6 of a transformer in series with two FETs 2 which are connected in series to each other with parasitic diodes being in opposite directions. In the case of the circuit shown in FIG. 15, a loss slightly occurs at the diode 3 when the switching circuit corresponding to one of the capacitors having an excessive energy is turned on. However, synchronous operation of the two FETs 2 can suppress occurrence of the loss, although the circuit configuration becomes complex. The circuit shown herein is configured with a plurality of diodes 3 used for clamping so as to drive the two FETs by the same signal.

Figure 17:
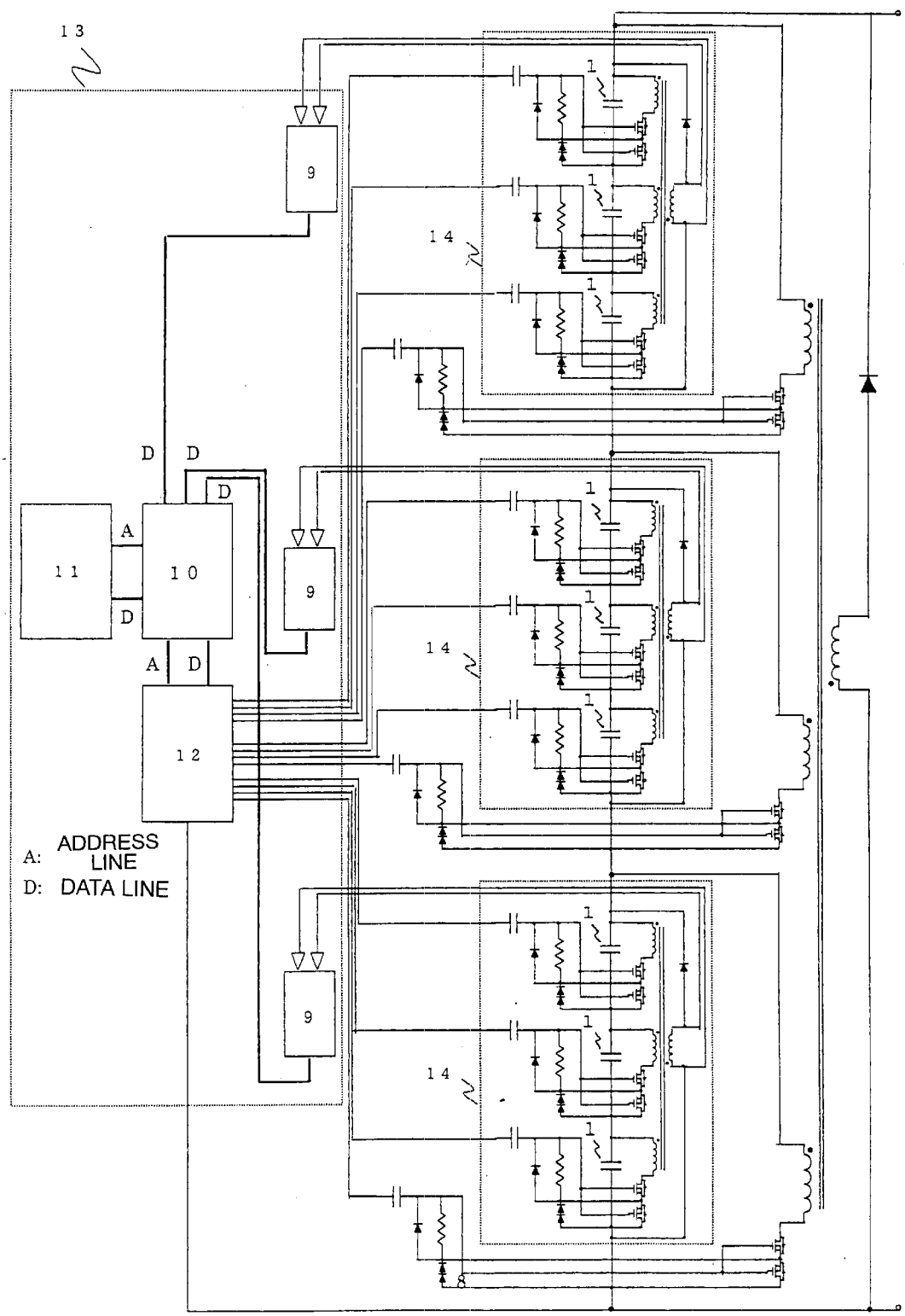
FIG. 17 is a diagram showing an energy storage device according to a tenth embodiment of this invention.

FIG. 17 shows a tenth embodiment of a cell energy adjustment device of this invention, which is an energy adjustment device comprising three unit energy adjustment devices connected in series with each other, each comprising three capacitor cells 1 connected in series with each other. There is no need to connect a voltage input circuit to a secondary coil of the final stage transformer and the control circuit can thereby be simplified. Operation is similar to that of FIG. 16, and it is possible to balance capacitor cells 1 to each other and to further balance the unit energy storage devices to each other.

Figure 18:
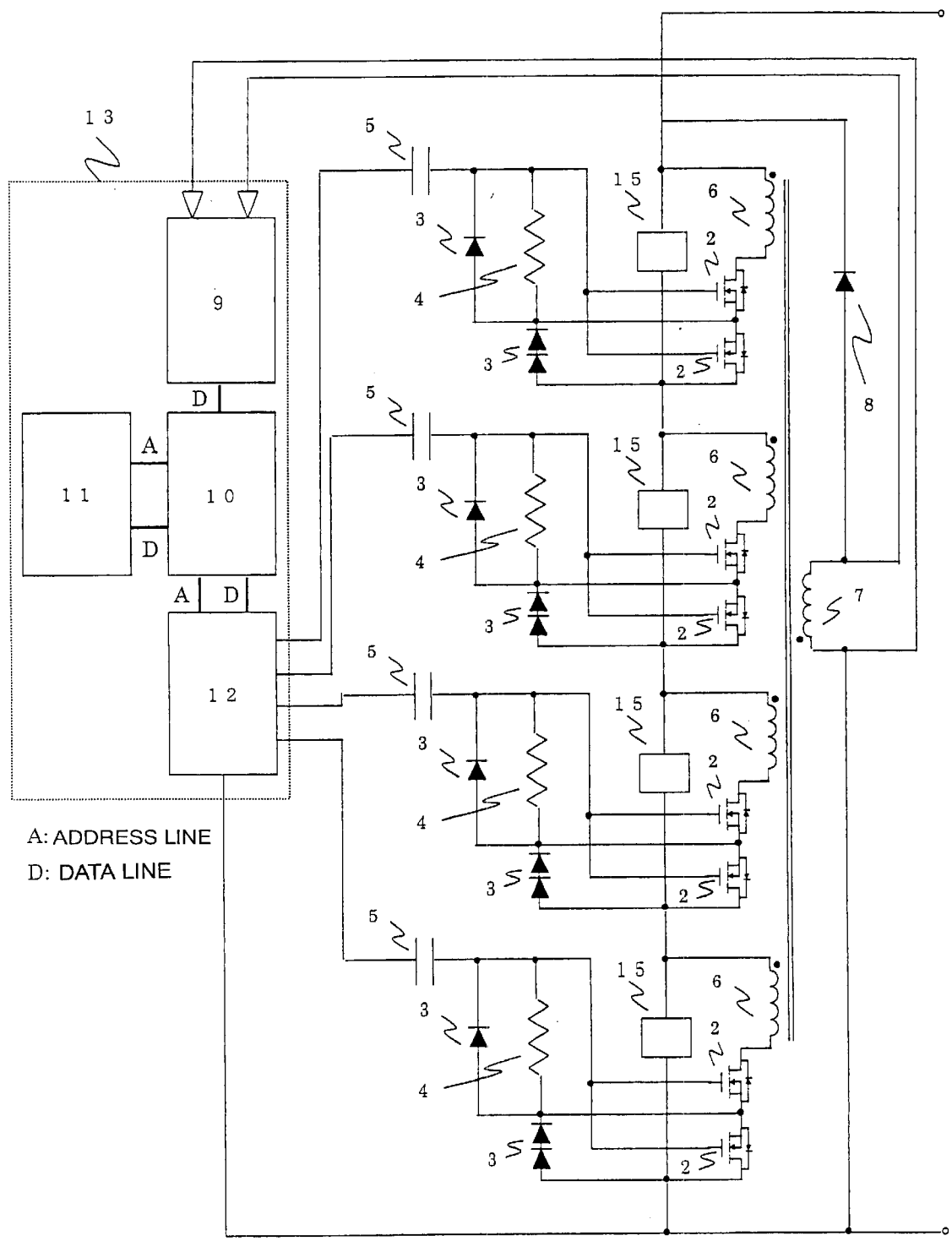
FIG. 18 is a diagram showing a cell energy adjustment device according to an eleventh embodiment of this invention.

FIG. 18 shows an eleventh embodiment of a cell energy adjustment device of this invention, which is an energy adjustment device in which four energy storage devices 15 are connected in series to each other so as to further increase the overall energy amount. Each of the energy storage devices may be a cell energy adjustment device which comprises a plurality of capacitor cells, a plurality of unit energy adjustment devices or a plurality of secondary battery cells, which are connected in series to each other. Alternatively, it may be a configuration comprising a plurality of units connected to each other, each unit being such an energy storage device as configured by the series connection.

In the above explanation, the capacitor cell was used as the energy storage cell, but a secondary battery cell can be used instead of the capacitor cell, and an energy storage device comprising a plurality of capacitor cells or secondary battery cells can also be used as one cell.

As shown above, by means of the eighth through eleventh embodiments of this invention, the cell energy adjustment device for an energy storage device comprising a plurality of electrical energy storage cells can be provided as means for efficiently adjusting energy amounts without loss accompanied.

Next, the 12th through 15th embodiments of this invention are explained.

In order to adjust the energy of each capacitor cell by the cell energy adjustment device shown in the above-described first through fifth embodiments, a control device must be provided at a secondary coil of a transformer. This secondary coil generally must have a number of winding turns which is equal to a value of a number of winding turns of a primary coil multiplied by the number of cells, and therefore occupies approximately half of the transformer volume itself. Further, the control device requires a mechanism to measure the voltages of respective capacitor cells, a memory to record the information measured, a CPU to judge the result measured, and a controller to control the switching circuits. In this method, maximum efficiency can be achieved, but the circuit becomes large and the control system becomes complex.

Hence, the 12th through 14th embodiments of this invention provide means for preventing complexity of the control mechanism in a cell energy adjustment device comprising a plurality of capacitor cells or secondary battery cells connected in series and a mechanism for transferring energy charged in one of the cells therefrom.

Figure 19:
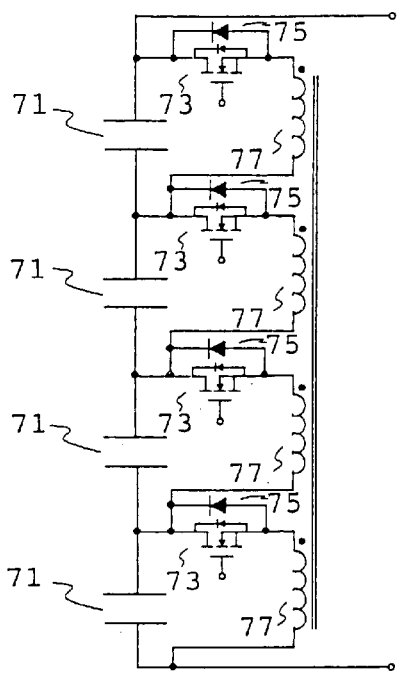
FIG. 19 is a circuit diagram showing a cell energy adjustment device according to a twelfth embodiment of this invention.

Referring to FIG. 19, the energy adjustment device of the 12th embodiment of this invention comprises four capacitor cells 71 connected in series.

Figure 20:
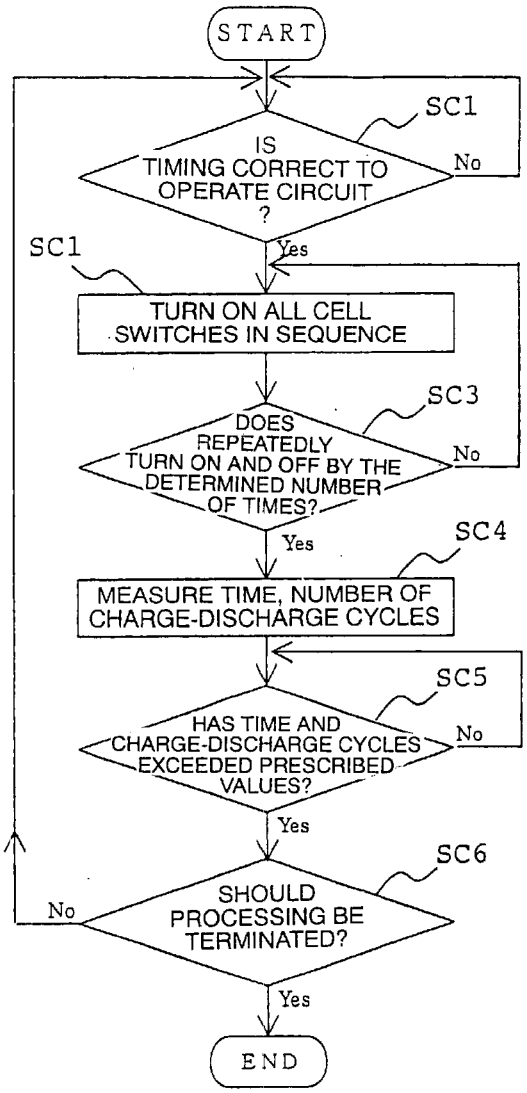
FIG. 20 is a flow chart of an example of the operation algorithm of a cell energy adjustment device according to this invention.

Compared with the above-described first through fifth embodiments, the secondary coil, which generally has numerous turns, is omitted, and accordingly the control circuit comprises only a function for sequentially controlling "ON"/"OFF" operation of the switching circuits but the voltage measurement mechanism and the memory mechanism are omitted therefrom. FIG. 20 shows a flow chart of the algorithm for operating this device.

Referring to FIG. 20, upon starting, a judgment is at first made as to whether the timing is correct to operate the circuit (step SC1). If the result is "NO", execution of the same step is repeated. If the result is "YES", the switches for all cells are sequentially turned on (step SC2). Next, a judgment is made as to whether "ON" and "OFF" operation has been repeated by a specified number of times (step SC3). If the result is "NO", execution returns to step SC2. If "YES", the time and the number of charge/discharge cycles are measured (step SC4). Next, a judgment is made as to whether the time and number of charge-discharge cycles exceeds prescribed values (step SC5). If the result is "NO", the same operation is repeated. If "YES", a judgment is made as to whether operation should be terminated (step SC6). If the result is "NO", execution returns to step SC1. When "YES", operation is terminated.

Specifically, it is supposed that the voltage of, for example, the second one of the capacitor cells is higher than the voltages of the other capacitor cells. Even if the FET connected to the first one of the capacitor cells is turned on, energy is transferred to neither the second capacitor cell having the voltage higher than the voltage of the first capacitor cell, nor the third or fourth capacitor cells which have the same voltage. When turning on the FET connected to the second capacitor cell, energy is transferred to the first, third and fourth capacitor cells which have a voltage lower than the voltage of the second capacitor cell. After sequentially performing the balancing operation for an appropriate number of cycles, there is a pause for a fixed length of time, and the balancing operation is then again repeated. The control circuit may be configured to only measure a number of charging and a number of discharging until reaching to a fixed number, then to again perform the balancing operation.

Figure 21:
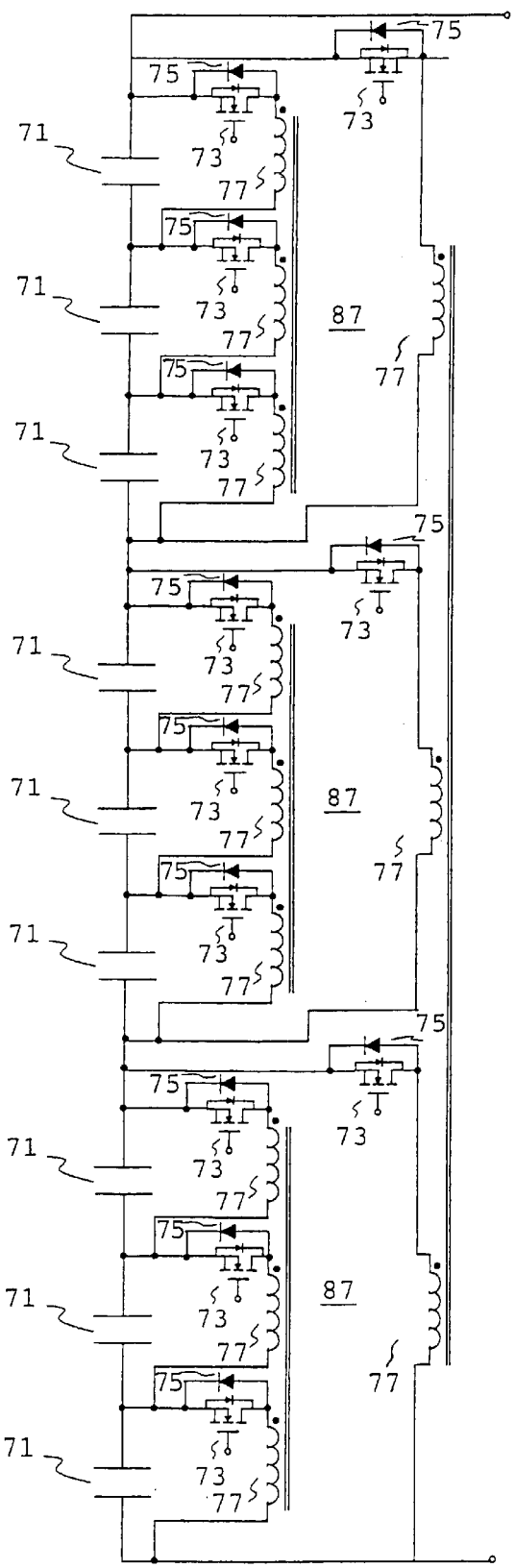
FIG. 21 is a circuit diagram showing an energy storage device according to a thirteenth embodiment of this invention; and, FIG. 22 is a circuit diagram showing an energy storage device according to a fourteenth embodiment of this invention.

Referring to FIG. 21, the energy adjustment device according to the 13th embodiment of this invention comprises three energy adjustment devices 87 connected in series to each other, each comprising three capacitor cells 71 connected in series with each other. A secondary coil, which generally has the greatest number of turns, is omitted, which makes the circuit configuration small even the case where there are numerous cells. Operation is similar to that shown in FIG. 19. Three capacitor cells 71 connected in series are at first balanced, and then the energy storage devices, each comprising three capacitor cells 71 connected in series, are balanced. Thus, balancing can be efficiently carried out.

Figure 22:
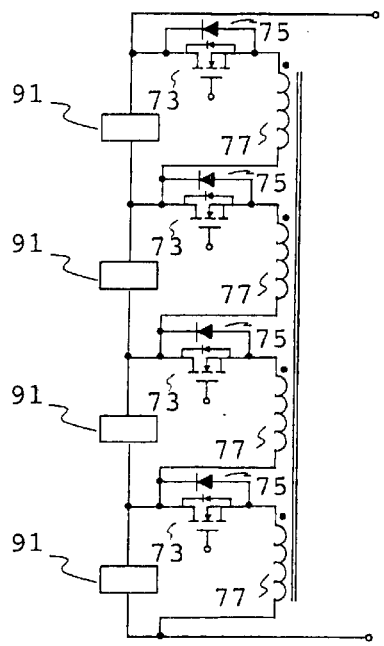

Referring to FIG. 22, the energy adjustment device according to the 14th embodiment of this invention comprises four energy storage devices 91 connected in series to each other, to thereby increase the overall amount of energy. Each of these energy storage devices 91 may be a cell energy adjustment device which comprises a plurality of capacitor cells and/or a plurality of secondary battery cells, connected in series to each other, or may be a configuration where a plurality of the cell energy adjustment devices are connected to each other, or may be configured by connecting a plurality of the similar energy storage devices in series with each other.

In the above explanations, a capacitor cell has been used as an energy storage cell but a secondary battery cell can be used in place of a capacitor cells. Alternatively, it is possible to use, as one cell, an energy storage device which comprises a plurality of capacitor cells or secondary battery cells.

As shown above, the 12th through 14th embodiments of this invention can provide a cell energy adjustment device in an energy storage device comprising a plurality of electrical energy storage cells, which is simplified in the control device and is thereby small-sized in overall configuration.

INDUSTRIAL APPLICABILITY

The cell energy adjustment device, cell energy adjustment method and electrical energy storage device of this invention are optimum to power supplies for electrical and electronic equipment, backup power supplies, and the like.

What is claimed is:

1. An energy storage device comprising a unit energy storage device having a plurality of capacitor cells or secondary battery cells connected in series to each other; and a cell energy adjusting device which transfers energy charged in one cell selected from said plurality of cells to input/output terminals of said unit energy storage device from the selected one cell, said cell energy adjusting device comprising:

a transformer having a plurality of primary coils and a secondary coil electrically insulated and mutually coupled magnetically;

a switching circuit which opens and closes a connection circuit connecting between said selected one cell and one coil among said plurality of primary coils;

a circuit connecting the secondary coil of said transformer to the input/output terminals of said unit energy storage device through a rectifying circuit; and, a control circuit which, by driving said switching circuit, adjusts the energy amount stored in said selected one cell to a specific ratio with respect to the overall energy amount stored by said unit energy storage device.

2. The energy storage device according to claim 1, wherein said plurality of cells are classified to form at least one cell group; said transformer is provided with a number of transformers corresponding to said at least one cell group constituting said unit energy storage device; and each of said transformers has a plurality of said primary coils which are connected respectively to the cells in each of said at least one cell group via said switching circuits, and said secondary coil, which is connected to the input/output terminals of said unit energy storage device through said rectifying circuit.

3. The energy storage device according to claim 2, wherein each of said respective transformers is provided with a third coil.

4. The energy storage device according to claim 1, wherein said transformer has a plurality of primary coils which are connected to corresponding ones of said plurality of cells via respective switching circuits, respectively, said secondary coil being connected to the input/output terminals of the unit energy storage device.

5. The energy storage device according to claim 4, wherein said transformer is further provided with at least one third coil.

6. The energy storage device according to claim 1, wherein a switching circuit is connected in series to the secondary coil of said transformer connected through said rectifying circuit to the input/output terminals of said unit energy storage device, or a switching function is added to the rectifying circuit connected in series to the secondary coil of said transformer, so that the connection between the input/output terminals of the unit energy storage device and the secondary coil of said transformer can thereby be temporarily interrupted.

7. The energy storage device according to claim 6, further comprising a circuit for supplying, through capacitors, control signals to the switching circuits connected to respective cells, based on either of a potential connected to the input/output terminals of said unit energy storage device or another potential of said selected one cell.

8. The energy storage device according to claim 1, further comprising a circuit adapted to detect an open terminal voltage of the secondary coil of said transformer connected to the unit energy storage device in synchronization with operation to control the switching circuit connected to said selected one cell, and to define the amount of energy stored in said selected one cell.

9. The energy storage device according to claim 1, further comprising energy normalization control means which comprises at least one of a control circuit and software for controlling the switching circuit connected to said selected one cell to partially transfer the energy stored in said selected one cell to the input/output terminals of said unit energy storage device to thereby control normalization of the energy amount stored in said selected one cell, when the energy amount stored in said selected one cell is defined as excessive with respect to the energy amount stored by said unit energy storage device.

10. The energy storage device according to claim 1, further comprising energy allocation means which comprises at least one of a circuit and software for determining a ratio of energy amount to be stored in each of the cells with respect to the energy amount stored by the unit energy storage device.

11. The energy storage device according to claim 1, which further comprises:

energy allocation means comprising at least one of a circuit and software for determining a ratio of energy amount to be stored in each of the cells in said unit energy storage device with respect to the energy amount stored by said unit energy storage device, when charging and discharging of the unit energy storage device are performed repeatedly, the unit energy storage device is left standing in a state in which an arbitrary amount of energy is stored, or the unit energy storage device is repeatedly left and charged/discharged; and a function for learning the appropriate amount to be stored in each of the cells from at least one of characteristics of each cell including an initial state thereof, and prediction of charging/discharging of the unit energy storage device.

12. A large-capacity energy storage device comprising a plurality of unit energy storage devices connected in series to each other, each of the unit energy storage devices comprising a plurality of capacitor cells or secondary battery cells connected in series to each other, said large capacity energy storage device having a higher terminal voltage than each of the unit energy storage devices while storing a larger amount of energy than each of the unit energy storage devices, and said large-capacity energy storage device including a cell energy amount adjusting device which is a device to transfer energy charged in one selected cell to the input/output terminals of one said unit energy storage device from the one selected cell, and which comprises a transformer having a plurality of primary coils electrically insulated and mutually magnetically coupled and a secondary coil; a switching circuit to open and close a connection circuit connecting between said one selected cell and one of said primary coils of said transformer; a circuit connecting the secondary coil of said transformer to the input/output terminals of the one said unit energy storage device through a rectifying circuit; and a control circuit for driving said switching circuit to adjust the amount of energy stored in each of the cells to a specific ratio with respect to the energy amount stored by the one said unit energy storage device; and wherein a relationship between said unit energy storage devices and the large-capacity energy storage device is made similar to another relationship between said energy cells and the one said unit energy storage device, or connections of said unit energy storage devices are further expanded to a prescribed number of layers.

13. An energy storage device comprising a plurality of unit energy storage devices connected to each other, each having a single electrical energy storage cell or a plurality of electrical energy storage cells; wherein each of said unit energy storage devices has a cell energy adjustment device which measures the amount of energy of the unit, memorizes and processes said measured amount of energy, and controls operation of switching circuits, to transfer energy charged in a selected one unit energy storage device via a transformer;

a plurality of coils are provided corresponding to each of said unit energy storage devices;

transformers are provided corresponding to respective unit energy storage devices;

a circuit is configured connecting transformer coils, switching circuits, and rectifying circuits; and energy is directly transferred from the selected one unit energy storage device to another unit energy storage device.

14. The energy storage device according to claim 13, wherein said electrical energy storage cells are either capacitor cells or secondary battery cells.

15. The energy storage device according to claim 13, wherein the plurality of unit energy storage devices are connected in series to each other; and each of the unit energy storage devices includes a mechanism similar to that in the energy storage device so that energy is transferred directly from the one selected unit energy storage device to a different one of the unit energy storage devices within the energy storage device, or to another energy storage device.

16. The energy storage device according to claim 13, wherein the connection of the unit energy storage devices is further extended to form a layered structure having a prescribed number of layers, and energy is directly transferred from one of the unit energy storage devices having a small amount of accumulated energy to unit energy storage devices having an equal level of accumulated energy, or to unit energy storage devices having a same or higher level of accumulated energy.

17. The energy storage device according to claim 13, wherein a relationship between said energy storage device and said unit energy storage devices is configured similar to another relationship between each of said unit energy storage devices and said capacitor cells or secondary battery cells; and wherein the energy of a selected capacitor cell or secondary battery cell is transferred to another of the cells or to another of the energy storage devices.

18. A cell energy adjustment method in which a plurality of energy storage devices each comprising a single electrical energy storage cell or a plurality of electrical energy storage cells, are connected in series to each other; a device for measuring the energy amounts of respective energy storage devices to memorize and process the measured results is provided; and energy charged in a selected one of the energy storage devices is transferred through a transformer by operating switching circuits controlled by the device;

wherein transformers are provided corresponding to the respective energy storage devices, coils of said transformers are connected to the switching circuits and rectifying circuits, and energy is transferred directly from any one of the energy storage devices to another one of the energy storage devices.

19. The cell energy adjustment method according to claim 18, wherein said electrical energy storage cells comprise a plurality of capacitor cells or secondary battery cells.

20. The cell energy adjustment method according to claim 18, wherein each of said energy storage devices comprises a plurality of unit energy storage devices; and each of said unit energy storage devices has mechanism similar to that in the energy storage device so that energy is transferred directly from one selected unit energy storage device to another of the unit energy storage devices within the same energy storage device, or to another energy storage device.

21. The cell energy adjustment method according to claim 18, wherein connection of the energy storage devices is further extended to form a layered structure having a prescribed number of layers, and energy is directly transferred from one of the storage devices having a small amount of accumulated energy to storage devices having an equal level of accumulated energy, or to storage devices having an equal or greater level of accumulated energy.

22. The cell energy adjustment method according to claim 18, wherein a relationship between said energy storage devices and said unit energy storage devices is configured similar to another relationship between said unit energy storage device and said capacitor cells or secondary battery cells, and wherein the energy of one selected capacitor cell or secondary battery cell is transferred to another of the cells or to another of the energy storage devices.

23. An electrical energy storage device comprising a plurality of unit energy storage devices connected in series to each other each having a single electrical energy storage cell or a plurality of electrical energy storage cells, and comprising a cell energy adjustment device; wherein said cell energy adjustment device is provided with a device to measure the energy amounts of each of the unit energy storage devices, to memorize and process said measured energy amount, and to control operation of switching circuits, to transfer, via a transformer, energy charged in any one of the unit energy storage devices; and a plurality of coils are provided corresponding to each of said unit energy storage devices;

transformers are provided corresponding to respective energy storage devices;

a circuit is configured connecting the transformer coils, switching circuits, and rectifying circuits; and energy is transferred directly from a selected one unit energy storage device to another unit energy storage device.

24. An energy storage device comprising a plurality of energy storage cells connected in series to each other and a cell energy adjustment device to adjust the energy amount of each of the cells; wherein said energy adjustment device comprises first switching circuits connected in series to said energy storage cells, and a first transformer comprising a plurality of coils connecting said first switching circuits to said series of the energy storage cells; and each of said first switching circuits comprises a first FET and either one of a diode connected in series to and in a direction opposed to a first parasitic diode of said first FET or a second FET having a second parasitic diode in a direction opposed to said first parasitic diode of said first FET.

25. An energy storage device comprising a plurality of first energy storage devices connected in series to each other, and an energy adjustment device which adjusts the energy amounts of said first energy storage devices; wherein said energy adjustment device comprises first switching circuits connected in series with said first energy storage devices, and a first transformer comprising a plurality of coils connecting said first switching circuits to said first energy storage devices; and each of said first switching circuits comprises a first FET, and either one of a diode connected in series to and in a direction opposed to a first parasitic diode of said first FET or a second FET having a second parasitic diode in a direction opposed to said first parasitic diode of said first FET.

26. The energy storage device according to claim 25, wherein each of said first energy storage devices comprises a plurality of second energy storage devices; and second switching circuits connected in series to said respective second energy storage devices; each of said switching circuits is connected in series to each of said second energy storage devices and one of the coils of a second transformer comprising a plurality of coils; and, each of said second switching circuits comprises a third FET and either one of a diode connected in series to and in a direction opposed to a third parasitic diode of said third FET or a fourth FET having a fourth parasitic diode in a direction opposed to said third parasitic diode of said third FET.

27. The energy storage device according to claim 26, wherein each of said second energy storage devices comprises a single capacitor or a single secondary battery.

28. The energy storage device according to claim 26, wherein each of said second energy storage devices comprises a plurality of capacitors or a plurality of secondary batteries, connected in series to each other.

29. A cell energy adjustment device for adjusting the energy amount of each of cells in a plurality of first energy storage devices, wherein a first switching circuit is formed by a FET and Schottky barrier diode connected in parallel to each other, said first switching circuit is connected in series to one of said first energy storage devices and to one coil of a first transformer comprising a plurality of coils, and a plurality of first energy storage devices connected to coils of said first transformer are connected in series to each other.

30. The cell energy adjustment device according to claim 29, wherein each of said first energy storage devices comprises a single capacitor cell or a single secondary battery cell.

31. The cell energy adjustment device according to claim 29, wherein each of said first energy storage devices comprises a plurality of second energy storage devices; each of said second energy storage devices is connected, together with a second switching circuit comprising a FET and a Schottky barrier diode connected in parallel to each other, to one coil of a second transformer comprising a plurality of coils, and a plurality of said second energy storage devices connected to said second transformer coils are connected in series to each other.

32. The cell energy adjustment device according to claim 31, wherein each of said second energy storage devices comprises a plurality of capacitor cells or a plurality of secondary battery cells, connected in series to each other.

33. The cell energy adjustment device according to claim 31, wherein each of said second energy storage devices comprises a single capacitor cell or a single secondary battery cell.

* * * * *